United States Patent
Kokubo et al.

(10) Patent No.: US 6,688,286 B2
(45) Date of Patent: Feb. 10, 2004

(54) KNOCK CONTROL APPARATUS FOR ENGINE

(75) Inventors: Naoki Kokubo, Nukata-gun (JP); Hirohiko Yamada, Okazaki (JP); Hideki Yukumoto, Kariya (JP); Hideyuki Maeji, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/156,692

(22) Filed: May 29, 2002

(65) Prior Publication Data

US 2002/0179053 A1 Dec. 5, 2002

(30) Foreign Application Priority Data

May 29, 2001 (JP) ........................... 2001-161088
Jul. 4, 2001 (JP) ........................... 2001-204025

(51) Int. Cl.[7] ............................................. F02P 5/152
(52) U.S. Cl. ............................. 123/406.33; 123/406.51
(58) Field of Search ..................... 123/406.15, 406.21, 123/406.29, 406.34–406.39, 425, 435; 701/111; 73/35.01, 35.02, 35.07, 35.09

(56) References Cited

U.S. PATENT DOCUMENTS

| | | | | |
|---|---|---|---|---|
| 4,599,982 A | * | 7/1986 | Sugiura ................. | 123/406.37 |
| 4,617,895 A | | 10/1986 | Sakakibarn et al. ... | 123/406.38 |
| 4,619,236 A | * | 10/1986 | Okada et al. ............. | 123/406.3 |
| 5,109,820 A | * | 5/1992 | Iwata et al. ............. | 123/406.37 |
| 5,343,843 A | * | 9/1994 | Hamren .................. | 123/406.38 |
| 6,427,662 B2 | * | 8/2002 | Tanaya et al. ......... | 123/406.29 |
| 6,474,302 B2 | * | 11/2002 | Takahashi et al. ...... | 123/406.21 |
| 2001/0015198 A1 | | 8/2001 | Kokubo et al. ......... | 123/406.37 |

FOREIGN PATENT DOCUMENTS

| | | |
|---|---|---|
| JP | 3-47449 | 2/1991 |
| JP | 4-203266 | 7/1992 |
| JP | 2621396 | 4/1997 |

* cited by examiner

*Primary Examiner*—Willis R. Wolfe
*Assistant Examiner*—Johnny H. Hoang
(74) *Attorney, Agent, or Firm*—Nixon & Vanderhye P.C.

(57) ABSTRACT

A knock control apparatus for engine has a knock sensor for detecting vibrations of the engine. The knock control apparatus determines an occurrence of knock by using at least one of a statistical process, a waveform process and a FFT process. The knock control apparatus desirably uses at least two of the above-described process for improving the accuracy of knock determination. The knock control apparatus learns a corrective value during a stable condition of the engine. The learned value is used for determining an ignition timing when the engine is in a transitional condition. Therefore, it is possible to detect a knock accurately, and reduce a knock when the engine is in the transitional condition.

34 Claims, 24 Drawing Sheets

FIG. 2
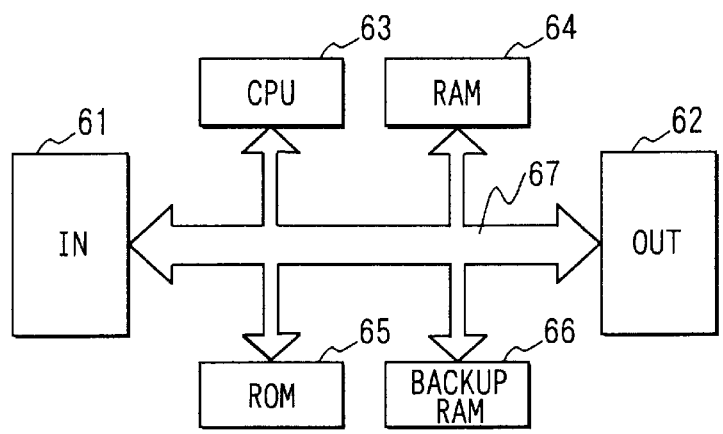
FIG. 4
| Q/Ne \ Ne | 8 | 12 | 16 | 20 | 24 | 28 | 32 | 36 | 40 | 44 | 48 | 52 | 56 | 60 | 64 | 68 |
|---|---|---|---|---|---|---|---|---|---|---|---|---|---|---|---|---|
| 0.30 | 26 | 33 | 40 | 42 | 47 | ← | ← | ← | ← | ← | ← | ← | ← | ← | 44 | 39 |
| 0.45 | 21 | 30 | 35 | 37 | 40 | 42 | 44 | ← | ← | ← | ← | ← | ← | ← | ← | 39 |
| 0.60 | 20 | 25 | 30 | 35 | 39 | 41 | 42 | ← | ← | ← | ← | ← | 43 | ← | ← | 39 |
| 0.75 | 17 | 23 | 27 | 31 | 35 | 37 | ← | ← | ← | 38 | 39 | ← | 41 | 42 | ← | 39 |
| 0.90 | 14 | 20 | 24 | 28 | 32 | 33 | ← | 34 | 35 | 37 | 38 | ← | 40 | 41 | ← | 39 |
| 1.05 | 6 | 13 | 19 | 23 | 26 | 30 | 31 | 32 | 33 | 35 | 36 | 36 | 37 | 38 | 37 | 37 |
| 1.20 | 3 | 9 | 15 | 19 | 22 | 26 | 27 | 30 | 32 | 34 | 35 | 35 | 35 | 36 | 35 | 35 |
| 1.35 | 2 | 7 | 13 | 17 | 20 | 24 | 25 | 28 | 30 | 32 | 33 | 33 | 33 | 34 | 33 | 33 |
| 1.50 | 0 | 5 | 11 | 15 | 18 | 22 | 23 | 26 | 28 | 30 | 31 | 31 | 31 | 32 | 31 | 31 |
ABSEIH
FIG. 5
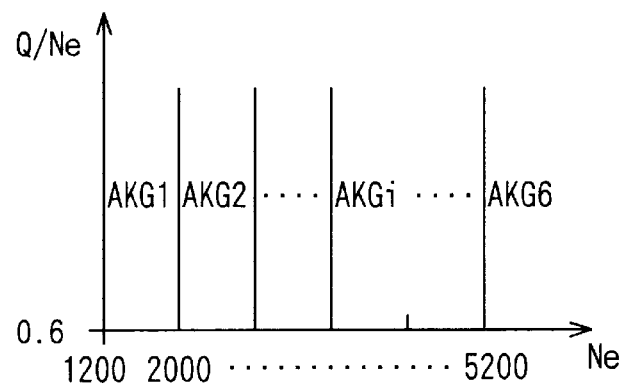

FIG. 7

| Ne<br>ΔTh | 1000 | 3000 | 5000 | 7000 |
|---|---|---|---|---|
| ΔTh1 | 10 | 5 | 2 | ...... |
| ΔTh2 | 12 | | | |
| ΔTh3 | : | | | |
| ΔTh4 | : | | | |

| MODE OF RESONANCE Pnm | RESONANCE FREQUENCY |
|---|---|
| $P_{10} = 1.841$ | $f_{10} = 7.0$ KHz |
| $P_{20} = 3.054$ | $f_{20} = 11.6$ KHz |
| $P_{01} = 3.832$ | $f_{01} = 14.6$ KHz |
| $P_{30} = 4.201$ | $f_{30} = 16.0$ KHz |
| $P_{11} = 5.332$ | $f_{11} = 20.3$ KHz |

$$F(x) = \frac{1}{1+\exp(-x)}$$

KNOCK CONTROL APPARATUS FOR ENGINE

CROSS REFERENCE TO RELATED APPLICATION

This application is based on Japanese Patent Applications No. 2001-161088 filed on May 29, 2001, and No. 2001-204025 filed on Jul. 4, 2001, the contents of which are incorporated herein by reference.

BACKGROUND OF THE INVENTION

1. Field of the Invention

The present invention relates to a knock control apparatus for an engine.

2. Description of Related Art

JP-B2-2621396 discloses a knock control apparatus that varies ignition timing in response to a detected octane rating of fuel. The apparatus prevents a knock in a stable condition of the engine such as a constant speed condition. But, in a transitional condition, delays for detecting an intake air amount and an engine rotational speed (engine speed) affect the ignition control, and condition of a combustion chamber varies in accordance with the transitional condition. Therefore, it is difficult to reduce knock when the engine is in a transitional condition such as an accelerating condition.

JP-A-4-203266 discloses an ignition timing control apparatus for varying ignition timing to provide a fine drivability when the engine is in the transitional condition. However, the apparatus does not utilize a knock control apparatus, therefore it is difficult to reduce knock in transitional conditions.

U.S. Pat. No. 4,617,895 (JP-B2-6-60621) discloses a knock control apparatus that uses a statistical process for detecting an occurrence of knock. The above apparatus uses a threshold level to determine the occurrence of knock. In this apparatus, it is difficult to determine the threshold level to discriminate signal and noise.

U.S. patent application Publication US2001/0015198A1 discloses a knock control apparatus that detects a knock based on waveform characteristics of sensor signal. Therefore, it is difficult to detect a knock accurately, especially in a range in which the sensor signal level is low.

SUMMARY OF THE INVENTION

It is an object of the present invention to provide a knock control apparatus for engine that is capable of controlling a knock accurately.

It is another object of the present invention to provide a knock control apparatus for engine that is capable of controlling a knock accurately in a transitional condition.

It is a still another object of the present invention to achieve the above object even if a knock occurrence condition is changed by an influence of a knock related parameters such as an octane rating, a deposit and aging of the engine.

It is a yet another object of the present invention to provide a knock control apparatus for engine that is capable of detecting a knock accurately.

According to a first aspect of the present invention, a knock control apparatus for engine comprises base ignition timing setting means for setting a base ignition timing in accordance with an operating condition of the engine, knock determining means for determining an occurrence of knock, retard value setting means for setting a retard value for retarding the base ignition timing when the occurrence of knock is determined. Therefore, the apparatus reduces knock by retarding the ignition timing based on the retard value. The apparatus further comprises retard value learning means for learning a learned value based on the retard value, base retard value setting means for setting a base retard value in accordance with an accelerating condition when an acceleration of the engine is determined, final corrective value setting means for setting a corrective value by correcting the base retard value based on the learned value, and ignition timing setting means for setting an ignition timing when the engine is in an acceleration, the ignition timing being set based on the base ignition timing and the corrective value. In this arrangement, the ignition timing in an acceleration condition is corrected based on the corrective value that reflects the learned value. Therefore, it is possible to reflect the retard value for reducing knock on the ignition timing in the acceleration condition.

According to a second aspect of the present invention, a knock control apparatus for engine, comprises a knock sensor that detects a knock of the engine, and a plurality of knock determining means for determining an occurrence of knock respectively, the determining means utilizing different processes for determining the occurrence of knock based on a sensor signal of the knock sensor, final determining means for determining an occurrence of knock based on the determinations of the plurality of determining means, and ignition timing controlling means for controlling an ignition timing based on the determination of the final determining means. Therefore, it is possible to improve the accuracy of determination of knock.

The plurality of knock determining means may include at least two of knock determining means such as statistical knock determining means for determining an occurrence of knock by utilizing a statistical process that processes the sensor signal, waveform knock determining means for determining an occurrence of knock based on a waveform characteristic of the sensor signal, and frequency analyzing knock determining means for determining an occurrence of knock by utilizing a frequency analyzing process that processes the sensor signal.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

FIG. 2 is a block diagram of an electric control unit according to the first embodiment;

FIG. 4 is a map for obtaining a base ignition timing according to the first embodiment;

FIG. 5 is a map for obtaining a learned value according to the first embodiment;

FIG. 7 is a map for obtaining a base retard amount in an acceleration according to the first embodiment;

DETAILED DESCRIPTION OF PREFERRED EMBODIMENTS

Figure 1:
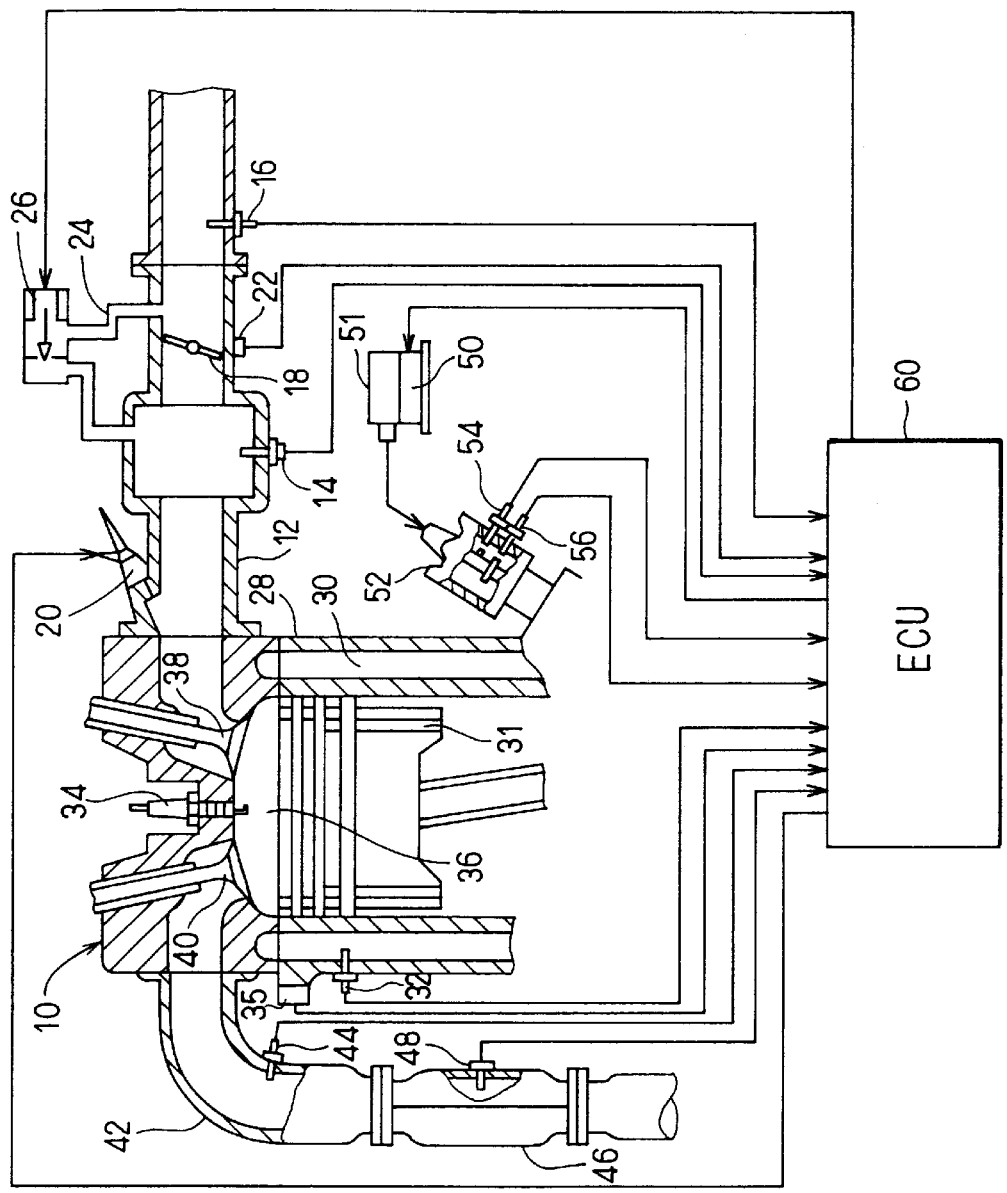
FIG. 1 is a block diagram of a knock control apparatus according to a first embodiment of the present invention.

FIG. 1 is a block diagram showing an engine and an engine control system. The engine control system includes a knock control apparatus for an engine.

The engine 10 is a power source for a passenger vehicle or the like. The engine 10 is a four (4)-stroke internal combustion engine with four (4) cylinders. Each cylinder has a piston 31 and a combustion chamber 36. Each cylinder has at least one of intake valve 38 and at least one of exhaust valve 40. Each cylinder has a spark plug 34 for ignite an air-fuel mixture in the combustion chamber 36. A cylinder block 28 defines a water jacket for circulating cooling water. The engine 10 has an intake passage 12. The engine 10 has an exhaust passage 42, and a catalyst 46 for purifying exhaust gas.

A throttle valve 18 is disposed in the intake passage 12. A bypass passage 24 and an idle speed control valve 26 is disposed on the intake passage 24 for controlling an idling engine speed. Four (4) fuel injectors 20 are disposed on each of branch passages of the intake passage 12 for supplying fuel into each of the cylinders. The engine 10 has a distributor 52 for distributing high tension voltage generated by a ignition coil 51 to the spark plugs 34.

An electronic control unit (ECU) 60 is mounted on the vehicle. The ECU 60 provides an engine controller for controlling several control parameters such as a fuel amount, an air-fuel ratio, a catalyst temperature, an ignition timing, and an idling engine speed. The ECU 60 controls the fuel injectors 20, the idling speed control valve 26, and an igniter 50 that controls the ignition coil 51 to generate a spark on the spark plugs 34 at the ignition timing commanded by the ECU 60.

The system has several sensors and the ECU 60 inputs signals from the sensors. An intake air temperature sensor 16 is disposed on the intake passage 12 for detecting an intake air temperature and outputting a signal indicative of the detected temperature. A throttle sensor 22 is disposed on a throttle shaft for detecting an opening degree of the throttle valve and output a signal indicative of the detected opening degree. The throttle sensor 22 includes a full-close switch and a full-open switch for detecting a full-close condition and the full-open condition of the throttle valve. The full-close switch functions as an idle switch that detects an idling condition in which an accelerator pedal is released and the throttle valve 18 reaches to a full-closed position. An intake air pressure sensor 14 is disposed on the intake passage 12 for detecting an intake pressure and outputting a signal indicative of the detected intake air pressure. The signal is used for determining an intake air amount Q.

A reference position signal sensor 54 is disposed on the distributor 52 for generating a reference position signal PS for identifying a reference cylinder of the engine 10. A rotation angle sensor 56 is also disposed on the distributor 52 for generating a rotation signal. The rotation angle sensor 56 generates pulses in every 30 crank-angle degrees (° CA). The signals from the sensors 54 and 56 indicates a rotational position of a crankshaft and allows precision timing controls such as an ignition timing control and an injection timing control. A water temperature sensor 32 is disposed on the engine block 28 for detecting a water temperature and outputting a signal indicative of the detected water temperature. A knock sensor 35 is disposed on the engine block 28 for detecting a vibration on the engine block and output a signal indicative of the detected vibration. The detected vibration includes knock components and noise components. The noise components include mechanical noise components and electrical noise components.

An oxygen concentration sensor (O2 sensor) 44 is disposed on the exhaust passage 42 for detecting an oxygen concentration and outputting a signal indicative of the detected oxygen concentration. The signal from the O2 sensor 44 is used to estimate an air-fuel ratio of the mixture. A catalyst temperature sensor 48 is disposed on the catalyst 46 for detecting a temperature of a catalyst substrate and output a signal indicative of the detected temperature.

The ECU 60 is a microcomputer as shown in FIG. 2. The ECU 60 has an input port 61, an output port 62, a CPU 63, a RAM 64, a ROM 65, a backup RAM 66, and a connecting bus line 67. The ECU 60 executes a memorized program in the ROM 65 for performing the engine control. Hereinafter, an ignition control process for reducing the knock of the engine is described.

Figure 3:
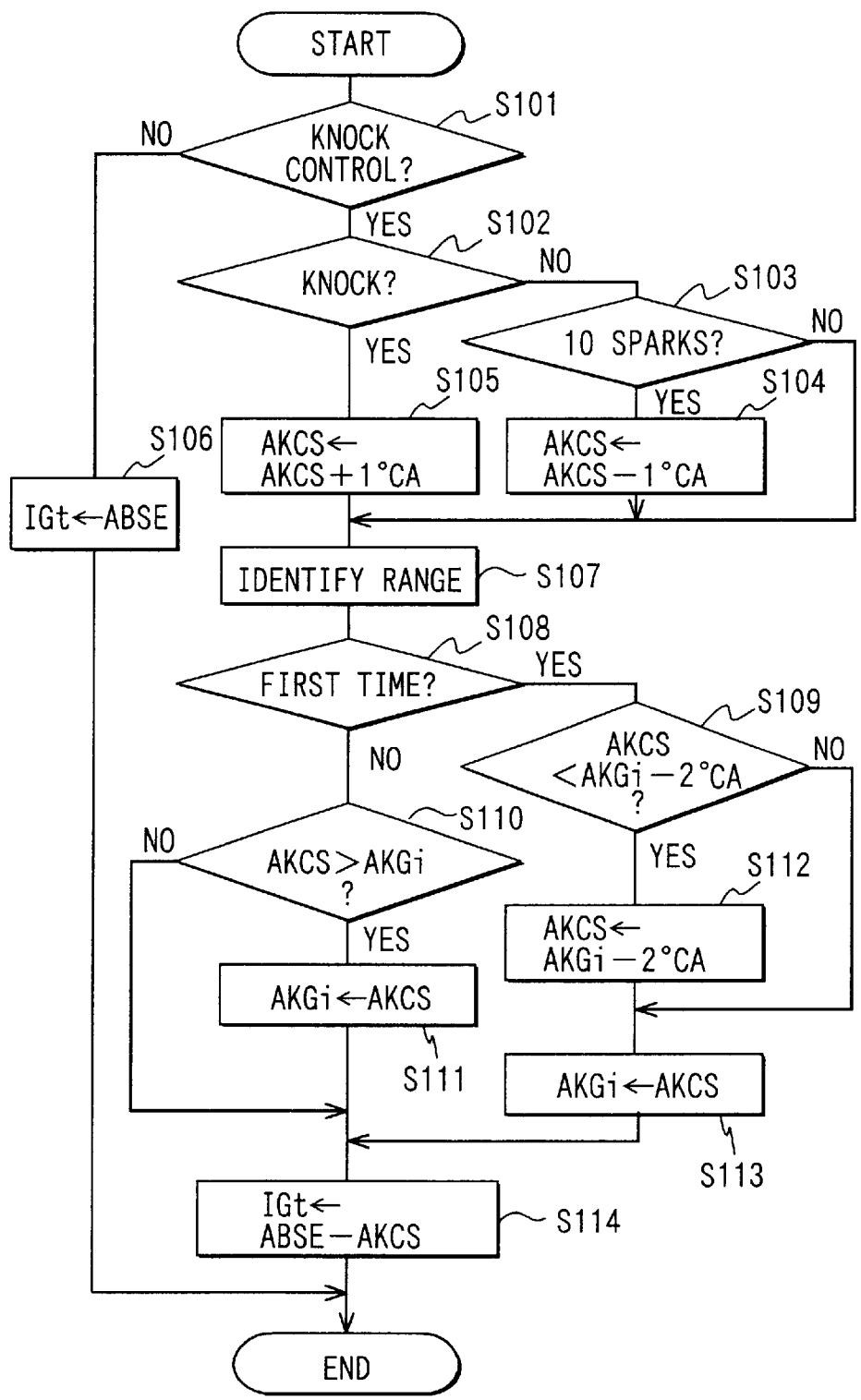
FIG. 3 is a flowchart showing an ignition timing control process according to the first embodiment.

FIG. 3 shows an ignition timing computing process for reducing the knock. In the description of the flowcharts, steps are referred to as S and numbers. In a S101, it is determined that whether or not a present operating condition of the engine is in a knock range where a knock may occur. In this step, several sensor signals are evaluated for determining needs of a knock control. For example, the ECU 60 determines the knock range in accordance with the engine speed Ne, an engine load Q/Ne, and a water temperature Tw. The ECU 60 determines that the present operating condition of the engine is in the knock range when the engine speed Ne is in a predetermined range, the engine load Q/Ne is higher than a predetermined reference value, and the water temperature Tw is higher than a predetermined reference temperature.

In a S106, an ignition timing IGt is set a base timing ABSE that is a value ABSEIH obtained by a map as shown in FIG. 4. The value ABSEIH is mapped in accordance with an engine load Q/Ne (liter/rpm) and the engine speed Ne (rpm). The engine load is obtained by an intake air amount Q per revolution (Ne).

When the knock range is detected in the S101, the routine branches to a S102 and computes the ignition timing IGt based on the base timing ABSE, a corrective retard amount AKCS, and a corrective learned value AKGi. In the S102, it is determined that whether or not a knock is occurred. In this step, well-known knock detecting methods can be used. For example, the signal from the knock sensor 35 and a threshold level can be used for detecting an occurrence of knock. For example, the occurrence of knock is determined by comparing a peak value of the knock sensor signal within a predetermined frequency range that characterizes the knock signal and a predetermined or variable threshold value.

If a knock is detected, in a S105, the AKCS is increased, e.g. one (1) crank angle degree, to set a greater retard amount. On the other hand, if no knock is detected, in a S103, it is determined that whether a predetermined numbers of sparks, e.g. ten (10) sparks, are generated or a predetermined time has elapsed. If a predetermined sparks are generated or a predetermined time has elapsed, in a S104, the AKCS is decreased, e.g. one (1) crank angle degree, to set a smaller retard amount.

In a S107, it is determined that whether or not the engine is in a predetermined learning range. For example, the engine load Q/Ne and the engine speed Ne can be used for determining the learning ranges as shown in FIG. 5. In this embodiment, six (6) of the learning ranges are determined with respect to the engine speed Ne, and six (6) of the corrective learned values AKGi (i=1-6) (AKG1, AKG2, AKG3, AKG4, AKG5, and AKG6) are memorized corresponding to each ranges. A maximum retard values are initially inputted in the AKGi to prevent the knock just after the engine is started. The AKGi are learned (updated) as the process is repeated.

In a S108, it is determined that whether or not a detected learning range in S107 is first time in an operation period, e.g. from start to stop of the engine. If it is the first time detection of the detected learning range, routine branches to S109, S112, and S113. In the S109, the AKCS is compared with a value two (2) crank angle degrees smaller than the AKGi. If the AKCS is smaller than the value AKGi-2, in the S112, the value AKGi-2 is inputted in the AKCS to set a greater retard amount. Then, in the S113, the AKGi is updated with the AKCS. As a result, the greater value (greater retard amount) of the AKCS or AKGi-2 is memorized as the AKGi. Therefore, the AKGi is usually decreased a predetermined crank angle degrees, e.g. two (2), just after the engine is started. In this embodiment, the predetermined crank angle degree is set greater than that of the S104 and S105.

If the engine has already experienced the detected range, in a S110, the AKCS is compared with the AKGi. In a S111, the AKGi is updated with the AKCS. As a result, the greater value (greater retard amount) of the AKCS or the AKGi is memorized as the AKGi. Therefore, AKGi varies within the maximum retard amount to a value two (2) crank angle degrees smaller than the maximum retard amount.

In a S114, the ignition timing IGt is obtained by subtracting the AKCS from the ABSE. Then, the ECU 60 drives the igniter 50 to generate spark on the spark plug 34 at an adequate ignition timing.

According to the process, the ignition timing IGt is advanced gradually in response to an absence of knock, and is retarded quickly in response to an occurrence of knock. As a result, when the engine is operated in a stable condition, the ECU 60 reduces the knock by retarding the ignition timing. Each of the corrective learned values AKGi keeps the greatest value, i.e. greater retard amount for a transitional condition.

Figure 6:
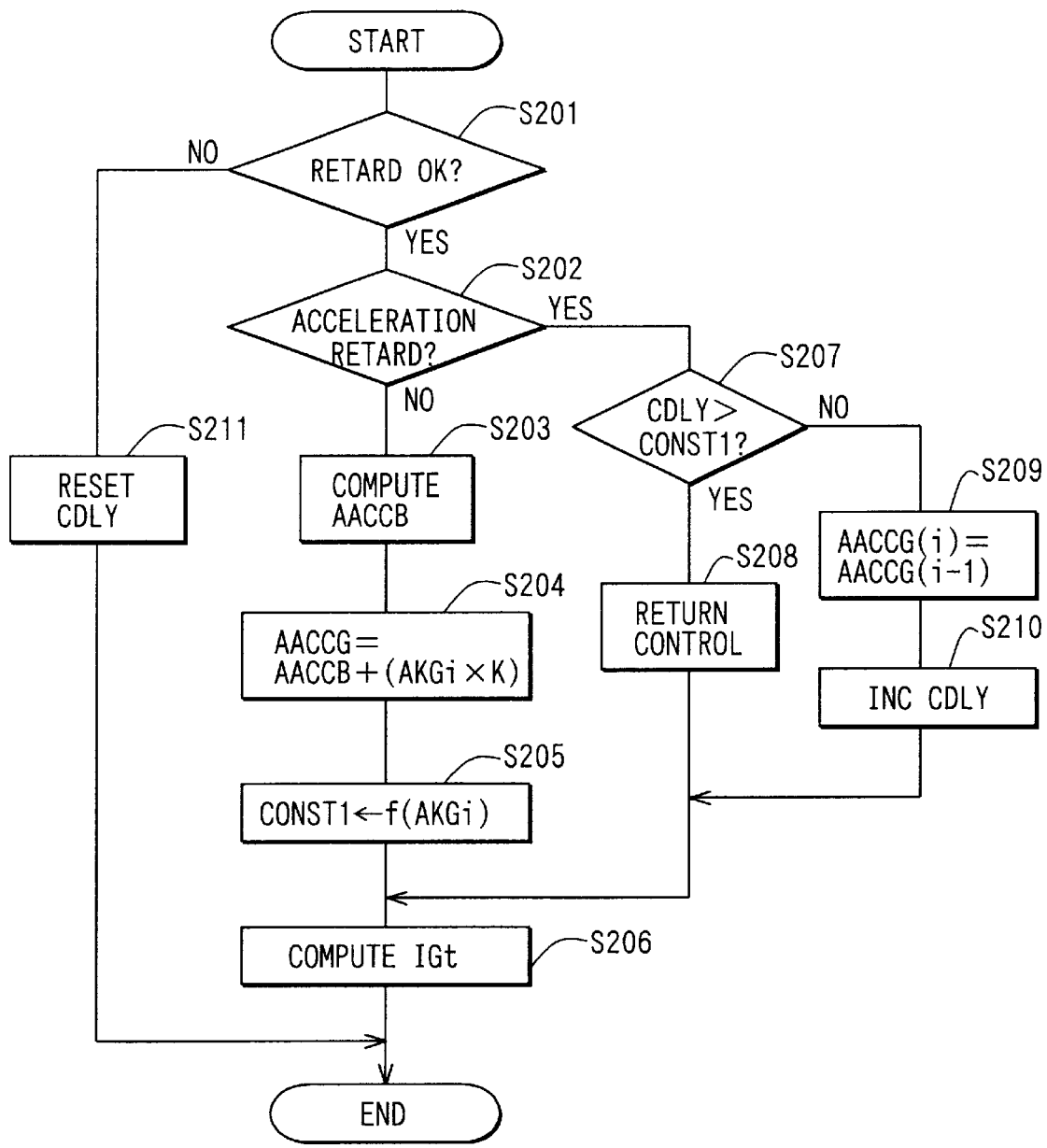
FIG. 6 is a flowchart showing an ignition timing computing process in an acceleration according to the first embodiment.
Figure 8A:
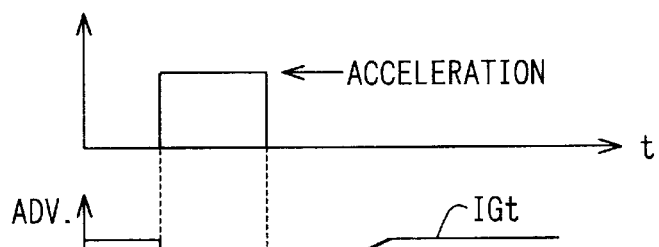
FIGS. 8A–8E are time charts showing a operation of the first embodiment.
Figure 8B:
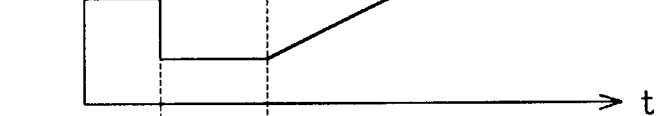
Figure 8C:
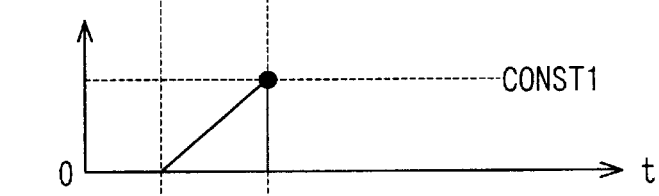
Figure 8D:
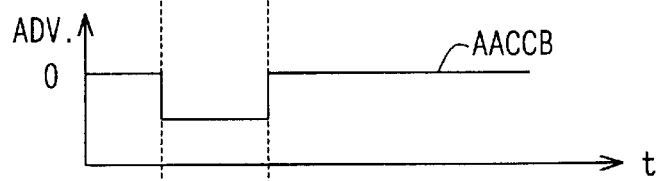
Figure 8E:
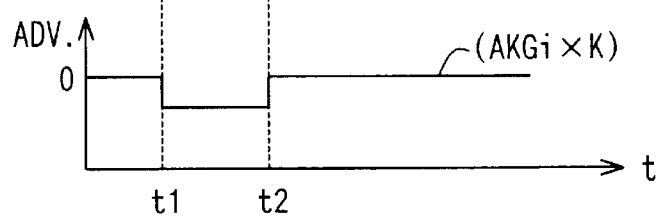

Referring to FIG. 6, a process for reducing the knock in a transitional condition will be described. In a S201, it is determined that whether or not the engine 10 is in a predetermined transitional knock control range. For example, when all of the following three (3) conditions are satisfied, the routine proceeds to a S202. (1) A transmission of the vehicle is not in a shifting state of shift positions. (2) A rapid acceleration control is running or is just completed. (3) The engine 10 is in an acceleration period.

In the S202, it is determined that whether the transitional knock control is running. In this embodiment, an acceleration knock control is the transitional knock control.

In a S203, a base acceleration corrective amount AACCB is computed by looking up a map as shown in FIG. 7. The base acceleration corrective amount AACCB is determined based on a difference value ΔTh of a throttle valve opening degree and the engine speed Ne. In a S204, a final acceleration corrective amount AACCG is computed based on the base acceleration corrective amount AACCB, the AKGi and a gain K by using an addition, subtraction or multiplication. In a S205, a value CONST1 is set based on the AKGi by using a predetermined functional calculation. The CONST1 determines a time period for executing a retard control in an acceleration condition. Therefore an ignition timing retarding period is set based on the learned value AKGi.

In a S206, an ignition timing IGt is determined based on the AACCG. As a result, the ignition timing IGt reflects the AKGi that is learned in the stable condition.

If the routine branches to a S207, in the S207, it is determined whether or not a count value CDLY exceeds the CONST1. If the CDLY is greater than the CONST1, the AACCG is maintained in a S209, and the CDLY is incremented in a S210. As a result, the AACCG is kept for the period of time determined by the CONST1. If the CDLY reaches the predetermined time, in a S208, an ignition timing return control is set. In the return control, a returning coefficient for returning the ignition timing gradually to normal ignition timing is set based on the AKGi. Therefore a returning speed is set based on the learned value. The process can be obtained by using a delay filtering process.

An example of operation by the embodiment is shown in FIG. 8. FIG. 8A shows a detection of acceleration. If an acceleration is detected at t1, the AACCB and the AKGixK are changed to retard the ignition timing as shown in FIGS. 8D and 8E. Therefore, the ignition timing IGt is retarded quickly as shown in FIG. 8B. Meanwhile, counting process of the CDLY begins and gradually increases the CDLY. The ignition timing is retarded in response to a detection of the acceleration condition that begins from the very beginning of the acceleration as shown in FIG. 3.

Then, when the CDLY reaches to the CONST1 at t2, the ignition timing IGt gradually is advanced to the normal timing by the process of the S208. In this embodiment, the CONST1 may be a fixed value.

According to the embodiment, it is possible to control the knock in an acceleration condition accurately even if a condition of the engine is changed by an aging, an octane rating, a deposit on the injector or the spark plug and the like. In this embodiment, the map of FIG. 4 provides a base ignition timing setting means, the map of FIG. 7 and the S205 provides a base corrective retard amount setting means, and the S206 of FIG. 6 provides a final corrective amount setting means.

The reference numbers used in the above embodiment are used for indicating the same or similar elements in the following embodiments, and the explanations are not repeated.

Figure 9:
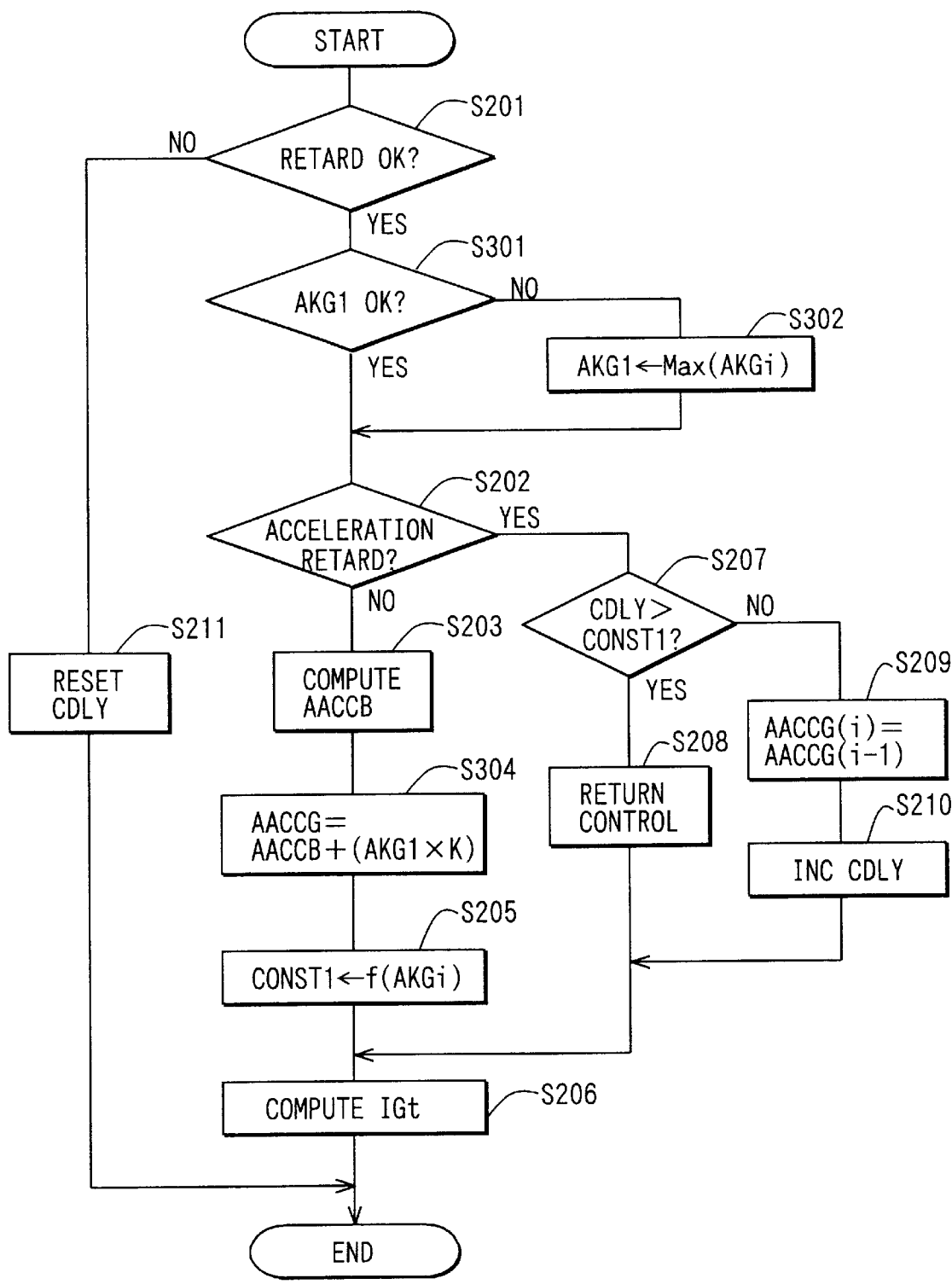
FIG. 9 is a flowchart showing an ignition timing calculating process in an acceleration according to a second embodiment of the present invention.

FIG. 9 shows a second embodiment of the present invention. In this embodiment, relatively advanced values are set in the AKGi as initial setting values. Therefore, the engine 10 may generate a knock if the initial value of the AKGi is applied to correct the ignition timing. In this embodiment, S301 and S302 are added to avoid the above-described disadvantage.

In the S301, it is determined that whether or not the AKG1 is learned. The AKG1 is the corrective learned value for the lowest engine speed range. If the AKG1 has not learned, the maximum value of the AKGi (i=2, 3, 4, 5, 6) is set in the AKG1. As a result, AKG1 always reflects the newest learned value and the most retard value.

In this embodiment, the AACCG is computed based on the AKG1 only in a S304. Therefore, the ignition timing reflects the most retard value of the corrective learned value AKGi. Since the AKG1 corresponds to the lowest engine speed range, the AKG1 is the most frequently learned. Therefore, it is possible to reduce the knock even if the AKGi are initially set advance side values. The AKG2 may be used instead of the AKG1.

Figure 10:
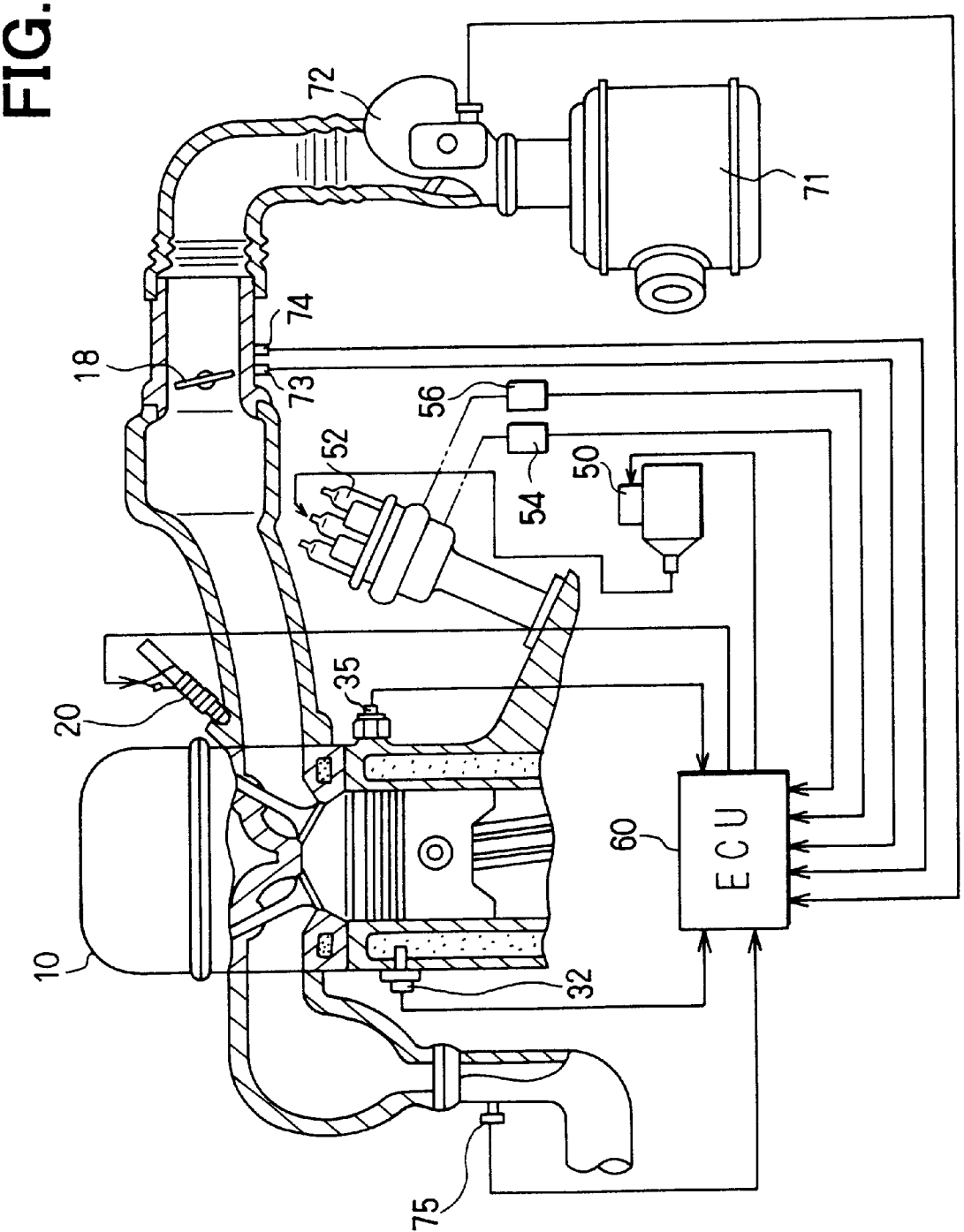
FIG. 10 is a block diagram of a knock control apparatus according to a third embodiment of the present invention.
Figure 11:
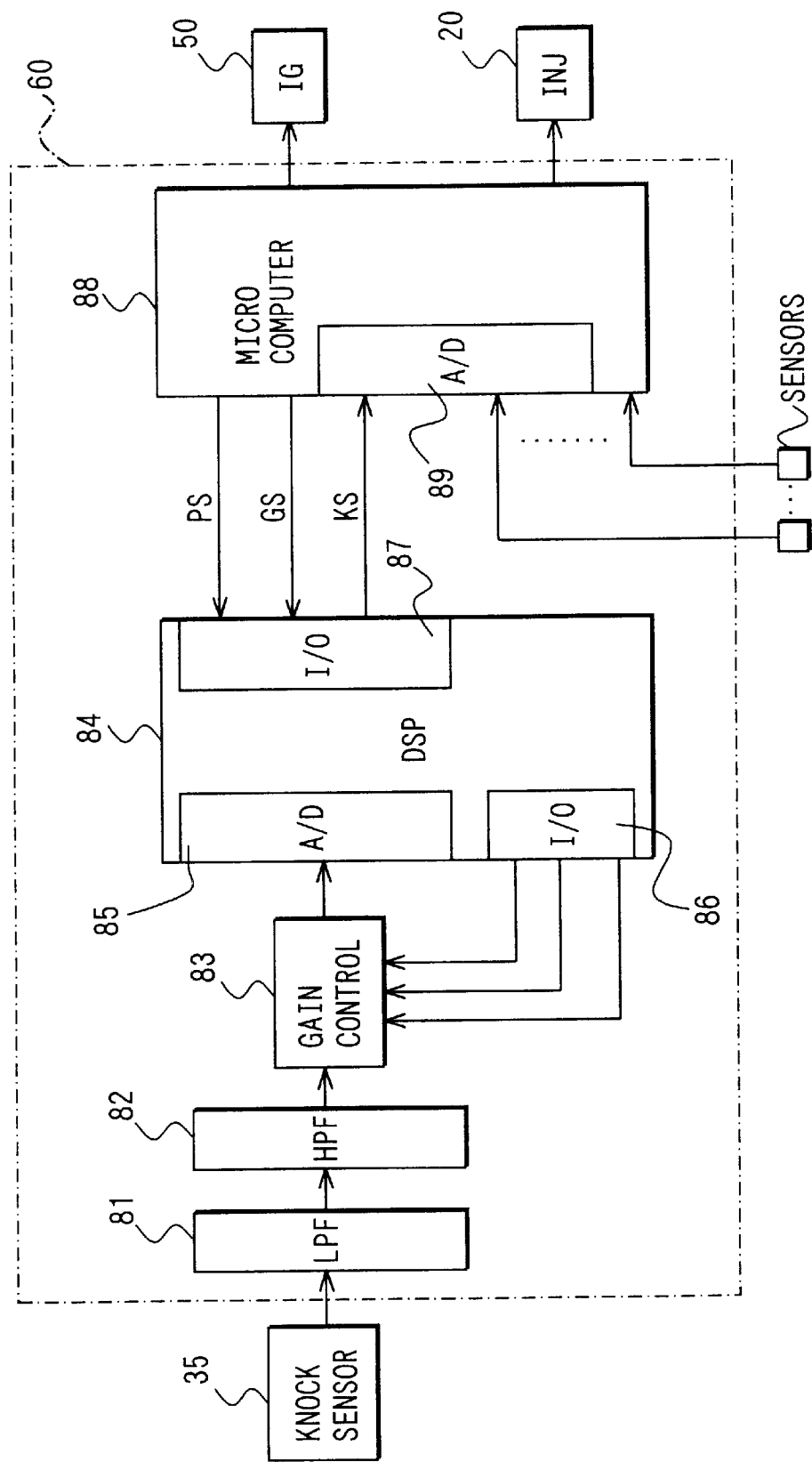
FIG. 11 is a block diagram of an ECU according to the third embodiment.

FIG. 10 shows a block diagram of an engine and an engine control system according to a third embodiment. FIG. 10 shows an air cleaner 71 and an airflow meter 72 for detecting an intake air amount. In this embodiment, a full-close switch 73 and a full-open switch 74 are disposed on the throttle valve 18. An O2 sensor 75 for detecting an air-fuel ratio is disposed on the exhaust passage. The O2 sensor 75 outputs a signal indicative of whether the air-fuel ratio is rich or lean in comparison to the stoichiometric air-fuel ratio. The knock sensor 35 is a non-resonant type so that the vibrations are detected over a wide frequency band.

Referring to FIG. 2, the knock sensor 35 is connected to a gain switching circuit 83 through a low pass filter (LPF) 81 and a high pass filter (HPF) 82. The LPF 81 removes noise frequency components of more than 20 KHz, and the HPF 82 removes noise frequency components of less than 1 KHz. Thus, the input signal produced from the HPF 82 has only signal components which primarily correspond to frequencies of the knock of the engine. The gain switching circuit 83 has a wide dynamic range corresponding to that of a 16-bit A/D converter and regulates the input signal to appropriate amplitudes.

The gain switching circuit 83 is connected to a digital signal processor (DSP) 84, which is capable of multiplication-processing the signal from the gain switching circuit 83 at high speeds. The DSP 84 has an analog/digital (A/D) converter 85 and parallel input/output circuits 86 and 87. The DSP 84 thus controls the gain of the gain switching circuit 83 by its gain switching signals produced from the I/O 86. The DSP 84 is connected to a microcomputer (MC) 88 for communicating with the same through the I/O 87. Specifically, the DSP 84 receives, from the MC 88, a reference position signal PS when an engine crankshaft rotates to a predetermined angular position, and also a first cylinder detection signal GS. The DSP 84 applies a knock determination signal KS indicative of an occurrence of knock to the MC 88. Cylinders other than the first cylinder are detected by counting the crankshaft rotation by a counter.

The MC 88 receives various sensor signals from a crankshaft angle sensor, intake air sensor, coolant temperature sensor and the like. Some sensor signals which are in digital form are applied directly to the MC 88, while other sensor signals which are in analog form are applied to an A/D converter 89 of the MC 88 to be converted into the digital form. The MC 88 calculates ignition timing and fuel injection amount based on those sensor signals, and drives an igniter 50 and injectors 20. In addition, the MC 88 corrects the ignition timing based on the knock determination signal KS applied from the DSP 84 to suppress the knock.

The MC 88 is constructed as a logic arithmetic circuit, which includes a central processing unit (CPU) for executing various calculations, a read-only memory (ROM), a random access memory (RAM) for storing various data, a backup RAM, an input/output circuit, a bus connecting those circuits, etc.

Figure 12:
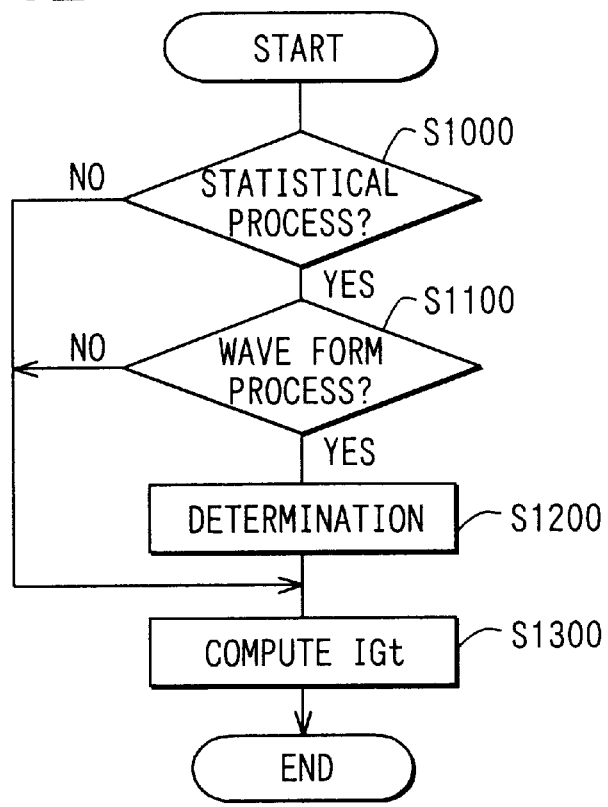
FIG. 12 is a flowchart showing a knock control process according to the third embodiment.

FIG. 12 is a flowchart showing a knock control process. In a S1000, it is determined that whether or not a statistical process successfully determines a potential knock. In a S1100, it is determined that whether or not a waveform process successfully determines a potential knock. If both of the processes determines a occurrence of potential knock, the routine proceeds to S1200. In the S1200, it is determined that whether the potential knock determined in the statistical process and the waveform process are an evident knock or not. If both of the potential knocks are the evident knock, the S1200 determines the occurrence of knock. In a S1300, the ignition timing IGt is computed based on the determination of S1200.

Figure 13:
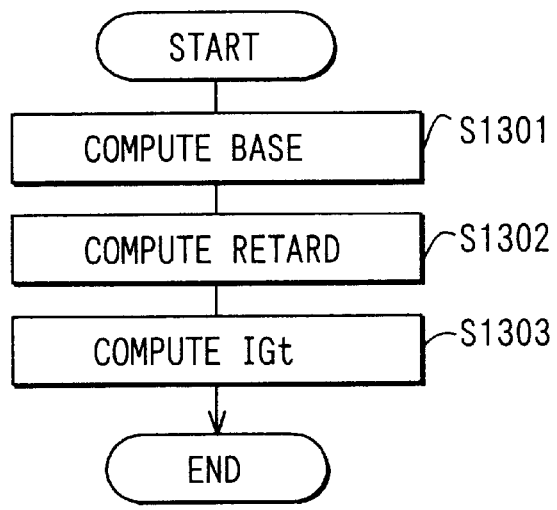
FIG. 13 is a flowchart showing an ignition timing computing process according to the third embodiment.

FIG. 13 shows the detail of the S1300. In a S1301, a base ignition timing is computed. For example, the base ignition timing can be obtained by looking up a map defined by an engine load and the engine speed. In a S1302, a corrective retard amount is computed. The corrective retard amount is increased when a knock is determined in the S1200. In a S1303, a final ignition timing IGt is computed based on the base ignition timing and the corrective retard amount. Then, the ECU 60 drives the igniter 50 to obtain the ignition timing IGt. As a result, the ignition timing IGt is retarded so as to reduce the knock.

Figure 14:
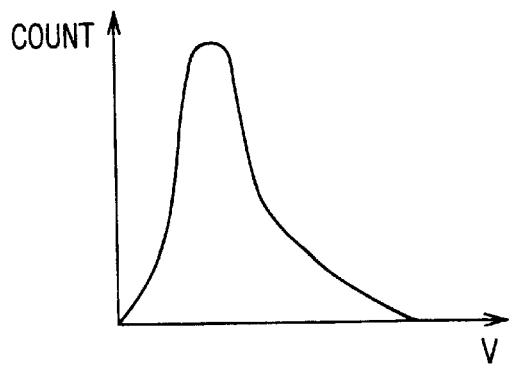
FIG. 14 is a graph showing a frequency distribution of knock sensor signals according to the third embodiment.
Figure 15:
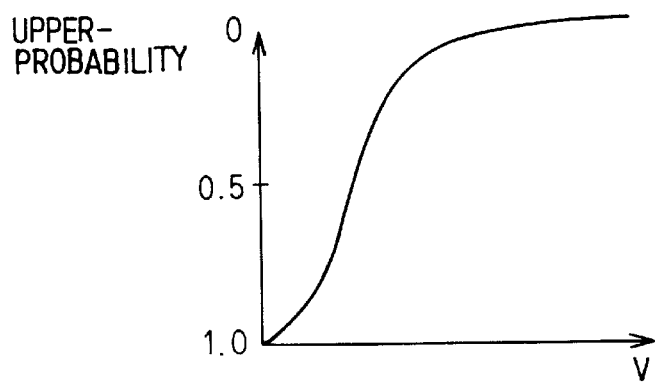
FIG. 15 is a graph showing a cumulative distribution of knock sensor signals according to the third embodiment.
Figure 16:
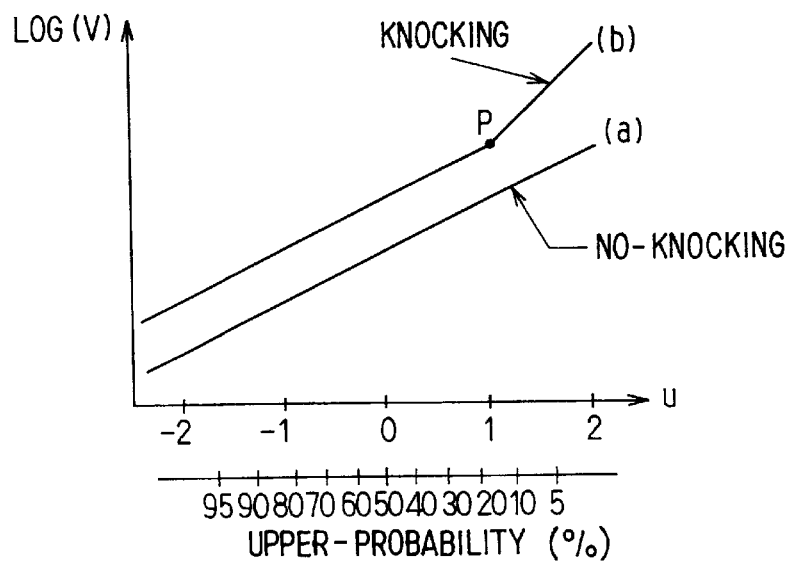
FIG. 16 is a graph showing a relationship between a ratio u and a logarithmic value LOG(V) according to the third embodiment.

FIGS. 14–25 show the statistical process. A similar process is disclosed in U.S. Pat. No. 4,617,895. FIG. 14 shows a frequency distribution pattern with respect to the maximum value of signals generated by the knock sensor. FIG. 15 shows a cumulative distribution diagram showing the upper probability integrals with respect to the maximum value of the signals generated by the knock sensor. FIG. 16 is a graph showing a distribution of logarithmic transformation value LOG(V) of the maximum value with respect to the ratio u of a deviation and a standard deviation with ratio is derived from the normal distribution table. This ratio corresponds to the upper probability integrals of the normal distribution (%), which will be hereinafter referred to as upper probability. The ratio u is defined by the following equation:

$$u=(x-\mu)/\sigma$$

where:
 x=LOG(V)
 $\mu$=x, representing the average of LOG(V)
 $\sigma$=$\sigma$(x), representing standard deviation of LOG(V)

The slope of the line in FIG. 16 corresponds to $\sigma$, and the value of LOG(V) when u=0 corresponds to $\mu$. In FIG. 16, a line (a) shows a distribution when no knock occurs, and a line (b) shows a distribution when knock occurs. Since the line (a) is in the form of a single straight line, it is meant that this distribution is of a normal distribution. On the other hand, since the line (b is in the form of two straight lines partitioned at a point of inflexion P, it is meant that this distribution (b) is of a combination of two normal distributions.

The slope of the line (b) up to the point P is approximately equal to that of the line (a) and the slope beyond the point P becomes greater than that of the line (a). The point P moves to the left in the graph as the frequency of the occurrence of knock increases. Therefore, the straight line at the right side beyond the point P represents a distribution of LOG(V) resulting from the occurrence of knock. As a result, it is possible to determine the occurrence of knock in accordance with the distribution pattern and this is a technical basis of the method.

In this embodiment, the knock determining method is modified to avoid a costly logarithmic transformation process. In this embodiment, a threshold value for determining a knock is determined based on a simplified method of the above-described technical basis.

Figure 17:
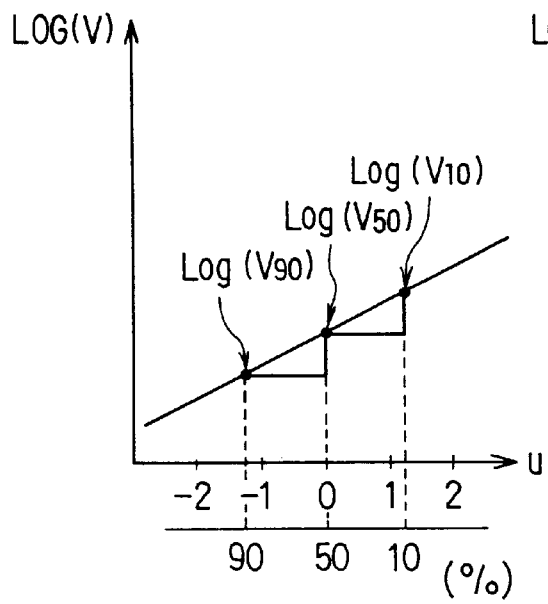
FIG. 17 is a graph showing the logarithmic value LOG(V) when no knock occurs.
Figure 18:
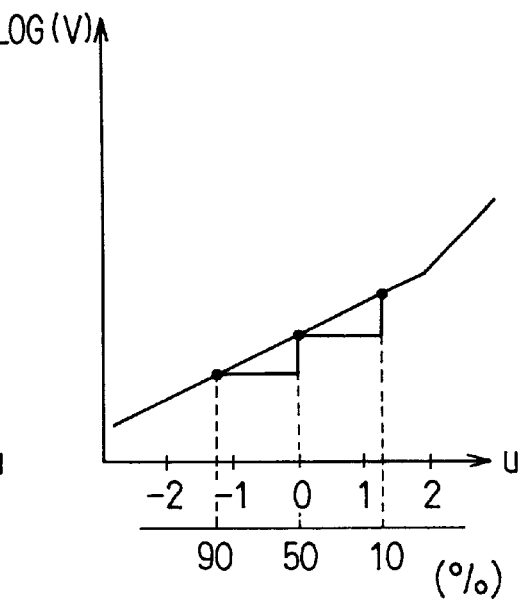
FIG. 18 is a graph showing the logarithmic value LOG(V) when knock occurs with low frequency.

FIG. 17 is a graph showing a distribution of LOG(V) provided in the absence of knock. FIG. 18 is a graph showing a distribution of LOG(V) when knock occurs with low frequency. In FIGS. 17 and 18, the following relationship is made up: Log(V10)–Log(V50)=Log(V50)–Log(V90). Where, each of V10, V50 and V90 represents upper probability of 10%, 50% and 90% respectively. Therefore, it is understood that V10/V50=V50/V90.

Figure 19:
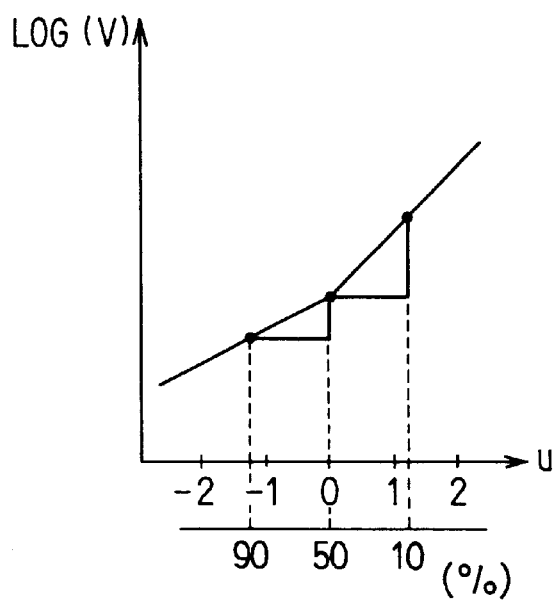
FIG. 19 is a graph showing the logarithmic value LOG(V) when knock occurs with high frequency.

FIG. 19 is a graph showing a distribution of LOG(V) when knock occurs with high frequency. In FIG. 19, V10/V50>V50/V90 is made up. Therefore, it is possible to determine the occurrence of knock based on the relationship of the V10, V50 and V90.

The V10, V50 and V90 can be obtained by the following method. For example, V10 can be obtained by V10=V10+9×$\Delta$V10 when V>V10, and V10=V10–1×$\Delta$V10 when V<V10, where V is a present maximum value, and $\Delta$V10 is a changing amount of V10. In this case, a ratio between the changing amount of V10 when V>V10 and the changing amount of V10 when V<V10 is set nine (9). Similarly, V50 can be obtained by setting the ratio in one (1), and V90 can be obtained by setting the ratio in 1/9.

It is desirable that the changing amounts vary in accordance with the output of the knock sensor 35. The value $\Delta$V50 may be an average of difference between V and V50. The value $\Delta$V50 may be obtained by $\Delta$V50=(3×$\Delta$V50+|V–V50|)/4. The value of V50 may be obtained by V50=V50+$\Delta$V50/4 when V>V50, and V50=V50–$\Delta$V50/4 when V<V50.

The threshold value is corrected based on a relationship of V10/V50 and V50/V90. Each of V10/V50 and V50/V90 is computed, for example, every 128 cycles interval. As a result, it is possible to determine a reliable threshold value. Additionally, it is also effective to correct the threshold value so that a ratio between V10 and V50 becomes a predetermined value, because the ratio between V10 and V50 does not change significantly in response to a change of engine conditions and engine types. For example, the predetermined value of the ratio is set a slightly greater value to the ratio between V10 and V50 when no knock occurs.

Figure 20:
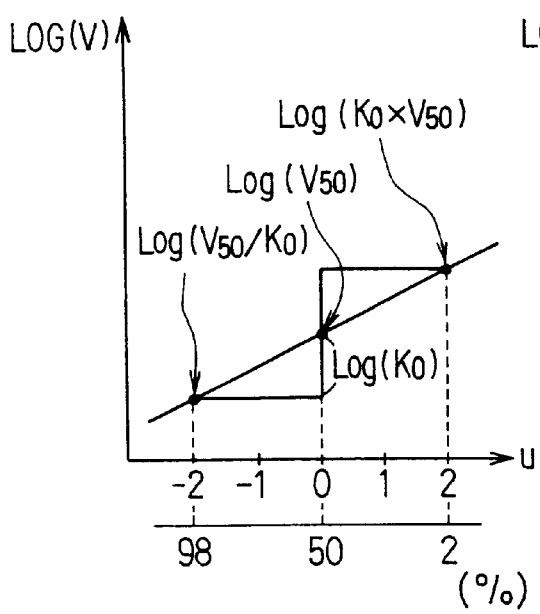
FIG. 20 is a graph showing the logarithmic value LOG(V) when no knock occurs.
Figure 21:
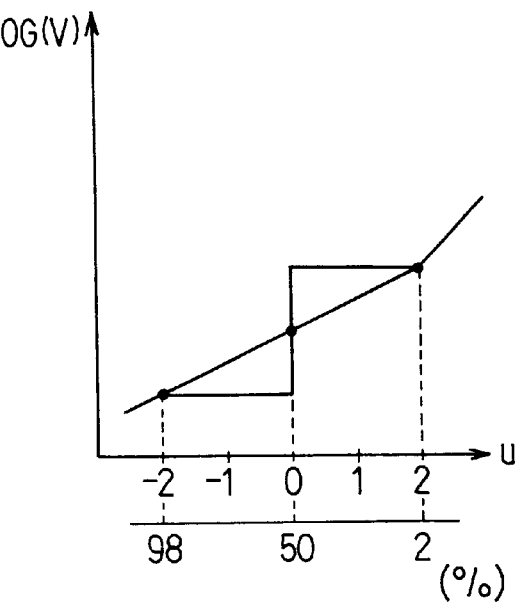
FIG. 21 is a graph showing the logarithmic value LOG(V) when knock occurs with low frequency.
Figure 22:
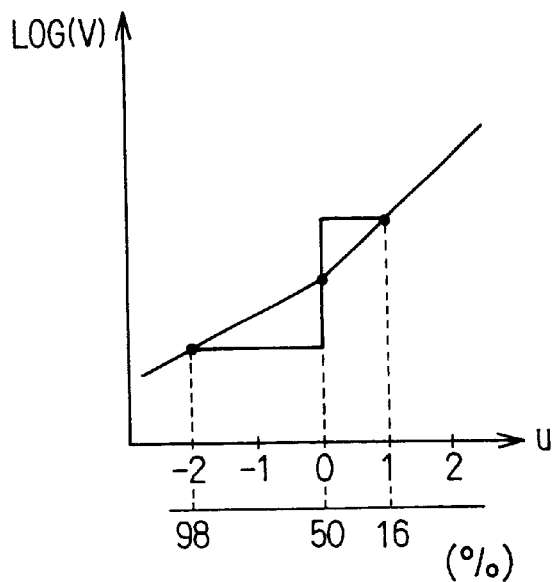
FIG. 22 is a graph showing the logarithmic value LOG(V) when knock occurs with high frequency.

It is also effective to correct the threshold value by using characteristics of the shape of the distribution of Log(V). For example, the probability of V>K0×V50, and the probability of V<V50/K0 indicate the occurrence of knock and the absence of knock, where V50 is a median of the distribution, and K0 is a predetermined constant. FIG. 20 shows a distribution of Log(V) when no knock occurs. FIG. 21 shows a distribution of Log(V) when knock occurs with low frequency. In the case of FIGS. 20 and 21, the probabilities of V>K0×V50 and V<V50/K0 are of equal value, since the shape of the distribution of Log(V) shows straight line within a range V50/K0<V<K0×V50. In case of FIGS. 20 and 21, the probabilities are 2% respectively. On the other hand, FIG. 22 shows the distribution of Log(V) when knock occurs with high frequency. The probability of $V>K0 \times V50$ exceeds the probability of $V<V50/K0$. In case of FIG. 22, the probability of $V>K0 \times V50$ is 16%, and the probability of $V<V50/K0$ is 2%. Therefore, an occurrence frequency of knock can be detected based on the probabilities of $V>K0 \times V50$ and $V<V50/K0$. Additionally, it is also effective to correct the threshold value so that the frequency of $V>K0 \times V50$ takes a predetermined value, because the frequency of $V>K0 \times V50$ does not change significantly in response to a change of engine conditions and engine types when knock occurs with low frequency. The predetermined value of the frequency of $V>K0 \times V50$ may be set a slightly greater value to the frequency of $V>K0 \times V50$ when no knock occurs.

Alternatively, the threshold value can be obtained by a simple calculation. A value of a certain % point on the distribution of V can be used. For example, the threshold value may be obtained by $K \times V50$.

Figure 23:
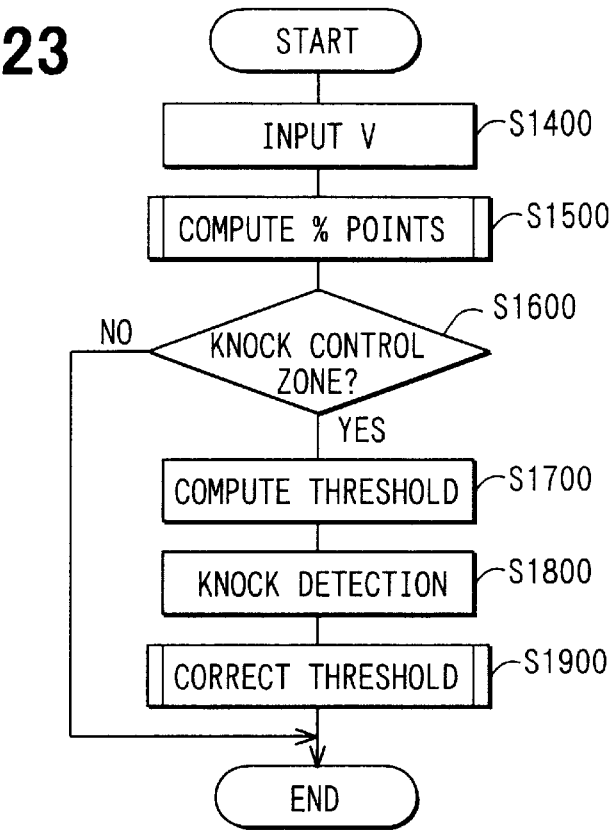
FIG. 23 is a flowchart showing a statistical process for detecting a knock according to the third embodiment.

FIG. 23 is the statistical process for determining the knock and correcting the threshold value for determining the knock. The routine begins in response to an interrupt request for computing the ignition timing. In a S1400, maximum values V of the sensor signal detected in a predetermined section are inputted corresponding to each of the cylinders. In a S1500, the above-described % points in the distribution of the maximum value V are computed. In a S1600, it is determined that whether or not the engine 10 is in a knock control zone based on the engine condition such as a load. In a S1700, a threshold value Vref for determining the occurrence of knock is computed. The threshold value Vref can be obtained by $Vref=K \times V50$. In a S1800, a knock determining process is carried out based on the maximum value V and the threshold value Vref. If the maximum value V is greater than the threshold value Vref, a knock flag is set "H" for indicating a determination of a potential knock. In a S1900, the threshold value Vref is corrected to improve the accuracy of knock determination.

Figure 24:
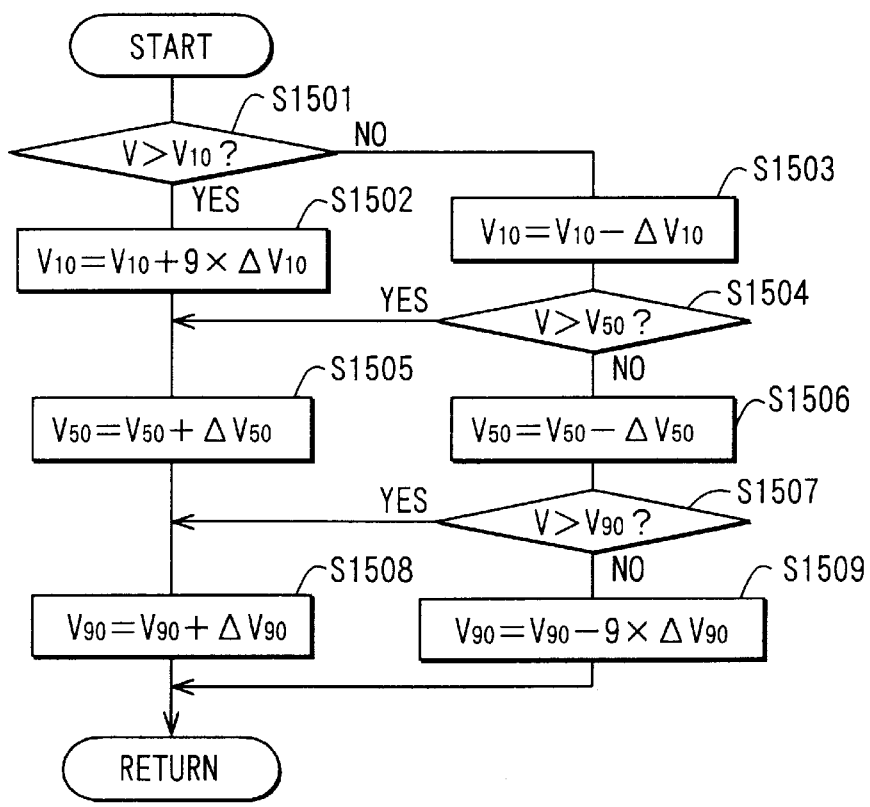
FIG. 24 is a flowchart showing the detail of the step 1500 in FIG. 23.

FIG. 24 shows the detail of the S1500. In a S1501, the present maximum value V detected from the sensor signal is compared with the value V10. The value V10 is memorized with respect to the cylinders. The value V10 is used for obtaining a value of the 10% point in the distribution of the maximum value V. In a S1502, V10 is renewed by $V10=V10+9 \times \Delta V10$. In a S1503, V10 is renewed by $V10=V10-\Delta V10$. As a result, the value V10 converges in an upper 10% point on the distribution. In a S1504, the present maximum value V is compared with the value V50. In a S1505, V50 is renewed by $V50=V50+\Delta V50$. In a S1506, V50 is renewed by $V50=V50-\Delta V50$. As a result, the value V50 converges in the median on the distribution. In a S1507, the present maximum value V is compared with the value V90. In a S1508, V90 is renewed by $V90=V90+\Delta V90$. In a S1509, V90 is renewed by $V90=V90-9 \times \Delta V90$. As a result, the value V90 converges in an upper 90% point on the distribution.

Figure 25:
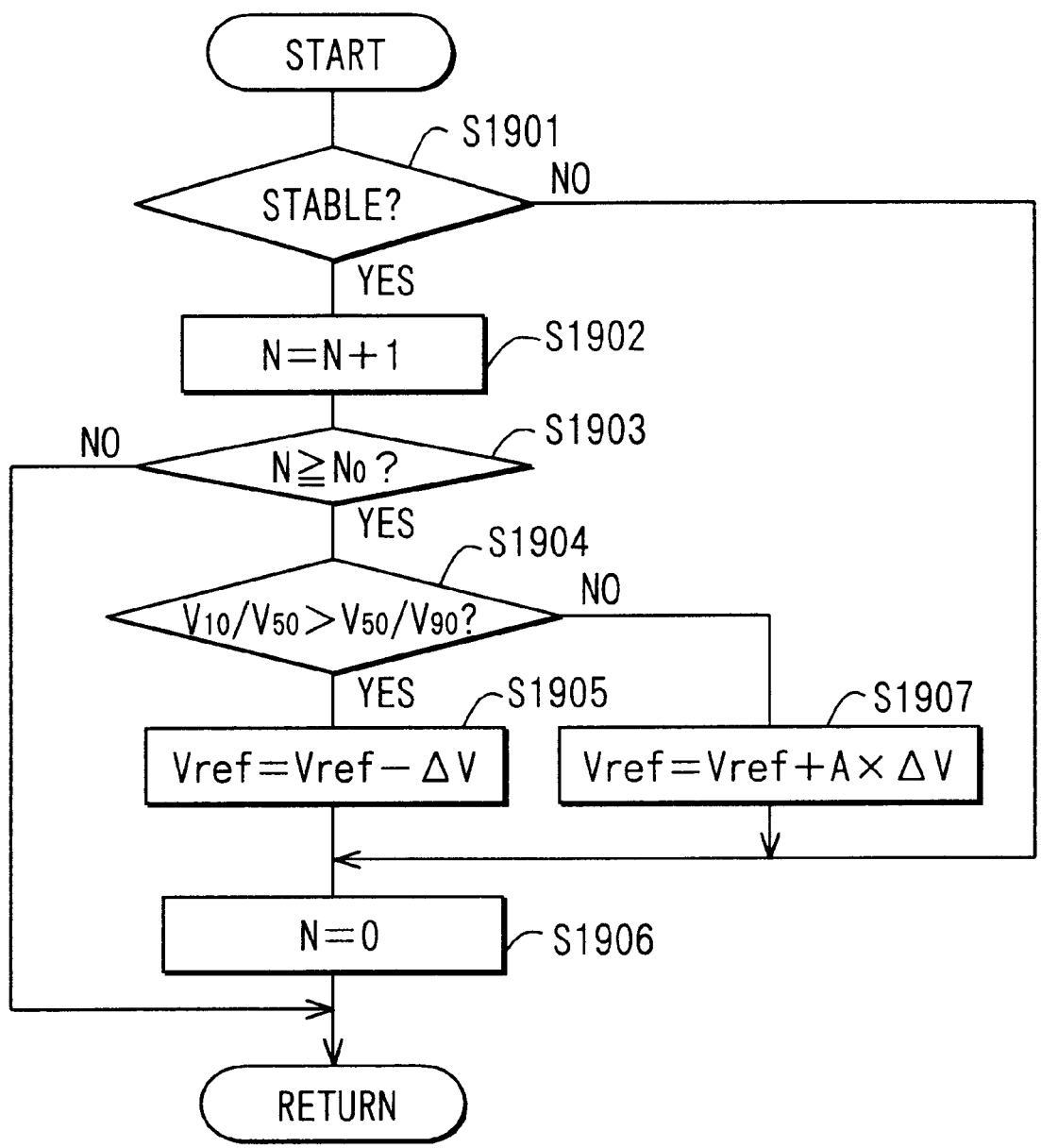
FIG. 25 is a flowchart showing the detail of the step 1900 in FIG. 23.

FIG. 25 shows the detail of the S1900. In a S1901, the engine speed Ne and the engine load Q/Ne are evaluated for determining that the engine is in a stable condition. When the engine 10 is operated under the stable condition, the routine proceeds to the following steps. In a S1902, a counter N is counted up. The counter N indicates number of combustion cycles. In a S1903, it is determined that whether or not the stable condition continues a predetermined time that is indicated by a counter value N0. If the stable condition continues for N0 cycles, in a S1904, a relationship of V10/V50>V50/V90 is evaluated. When V10/V50>V50/V90 is met, in a S1905, the threshold value Vref is slightly decreased by $\Delta V$. On the other hand, in a S1907, the threshold value Vref is slightly increased by $A \times \Delta V$, where A is a constant greater than one (1). As a result, the threshold value Vref is kept increasing when the routine branches evenly in the S1904. In a S1906, the counter N is reset.

According to the statistical process, the occurrence of knock is determined only when the sensor signal exceeds the threshold value. Therefore, the statistical process does not determine the occurrence of knock when the sensor signal is relatively low magnitude.

Figure 26:
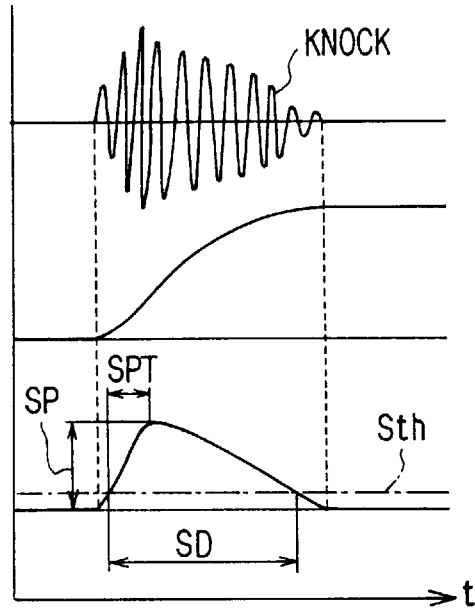
FIG. 26 is a time chart showing a knock signal, an integrated value and differentiated value.
Figure 27:
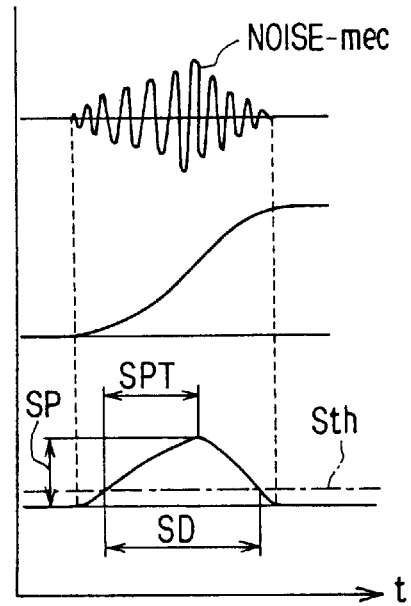
FIG. 27 is a time chart showing a mechanical noise signal, an integrated value and differentiated value.
Figure 28:
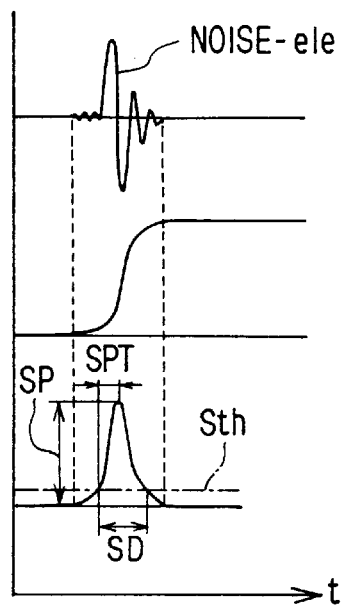
FIG. 28 is a time chart showing a electrical noise signal, an integrated value and differentiated value.

The waveform process for determining a knock is explained with reference to FIGS. 26, 27, 28 and 29. FIGS. 26, 27 and 28 show, respectively, three signal patterns, that is, knock signal KNOCK, mechanical friction noise signal NOISE-mec and electrical noise signal NOISE-ele, which are derived from the knock sensor. In FIGS. 26, 27 and 28, the upper waveform shows the sensor signal, the middle curve shows an integrated value of the sensor signal, the lower curve shows an differentiated value of the integrated value, and a predetermined threshold level is indicated by Sth, which is set not for checking for occurrence of knock but for determining a signal generation period SD for signal processing. SP indicates a peak of the signal, and SPT indicates a peak time at which the peak SP appears after the start of the signal generation period SD.

The knock signal KNOCK is generated as shown in FIG. 26 due to self-ignition of fuel within each engine cylinder. The knock signal KNOCK has such a characteristics that it increases at the initial stage and then gradually attenuates due to resonance of pressure within the engine cylinder. That is, in the case of the knock signal KNOCK, a large peak SP appears at an early time SPT in a relatively long signal generation period SD as understood from the differentiated signal pattern.

The mechanical friction noise signal NOISE-mec is generated as shown in FIG. 27 due to friction between individual parts of the engine. As the friction pressure gradually increases and gradually decreases in a rotary body, the friction noise signal changes similarly. That is, in the case of the friction noise signal NOISE-mec, a small peak SP appears at an intermediate time SPT in a relatively long signal generation period SD as understood from the differentiated signal pattern.

The electrical noise signal NOISE-ele is generated temporarily as shown in FIG. 28 due to turning on or off of the electrical loads. As a result, the electrical noise signal has such a characteristics that it sharply rises and sharply falls. That is, in the case of the electrical noise signal NOISE-ele, a large peak SP appears at an early time SPT in a short signal generation period SD as understood from the differentiated signal pattern. This electrical noise signal has a similar signal pattern as that of a mechanical noise signal corresponding to hitting sound.

Figure 29:
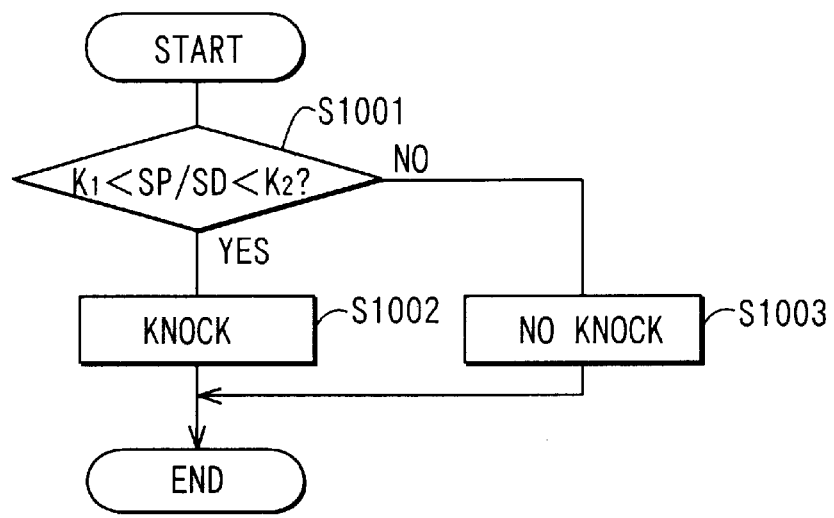
FIG. 29 is a flowchart showing a waveform process for detecting a knock according to the third embodiment.

The DSP 84 is programmed to execute the waveform process as shown in FIG. 29 thereby to determine an occurrence of a potential knock. This process is repeated for each combustion cycle of the engine indicated by the reference position signal PS and the first cylinder signal GS applied from the MC 88.

In FIG. 29, it is assumed that the DSP 84 detects a peak level SP and a signal generation period SD of the signal derived as above from the sensor signal, and calculates a ratio (SP/SD) between the peak level SP and the period SD. The DSP 84 compares, at a S1001, the calculated ratio SP/SD with lower and upper references K1 and K2. The references K1 and K2 are set for checking which pattern of FIGS. 26, 27 and 28 the subject signal has. In this embodiment, the DSP 84 sets the period SD based on a threshold value Sth and a differentiated value, and detect the peak value SP as a maximum value in the period SD.

If the comparison result is YES (K1<SP/SD<K2), the signal pattern is determined to correspond to the knock pattern of FIG. 26. The DSP 84 thus determines occurrence of knock at a S1002 and sets a knock flag to "1". If the comparison result is NO, the signal pattern is determined to correspond to either pattern of FIG. 27 or FIG. 28, which indicate the mechanical friction noise pattern or electrical noise pattern, respectively. The DSP 84 thus determines no occurrence of knock at a S1003 and resets the knock flag to "0".

As described above, the occurrence of knock is finally determined if both of the statistical process and the waveform process determine the potential knock simultaneously. As a result, it is possible to determine the knock accurately. For example, if the statistical process determines a potential knock but the maximum value V is close to the threshold value, the waveform process can perform the knock determination with high accuracy because the sensor signal has enough magnitude. On the other hand, when the sensor signal is not sufficient to ensure the accuracy of the knock determination of the waveform process, the statistical process can provide a reliable knock determination that is effective to reject an incorrect knock determination of the waveform process.

The process shown in FIG. 24 provides a statistical knock determining means including a statistical processing means and a first potential knock determining means. The process shown in FIG. 12 provides a final knock determining means. The process shown in FIG. 13 provides an ignition timing controlling means.

Figure 30:
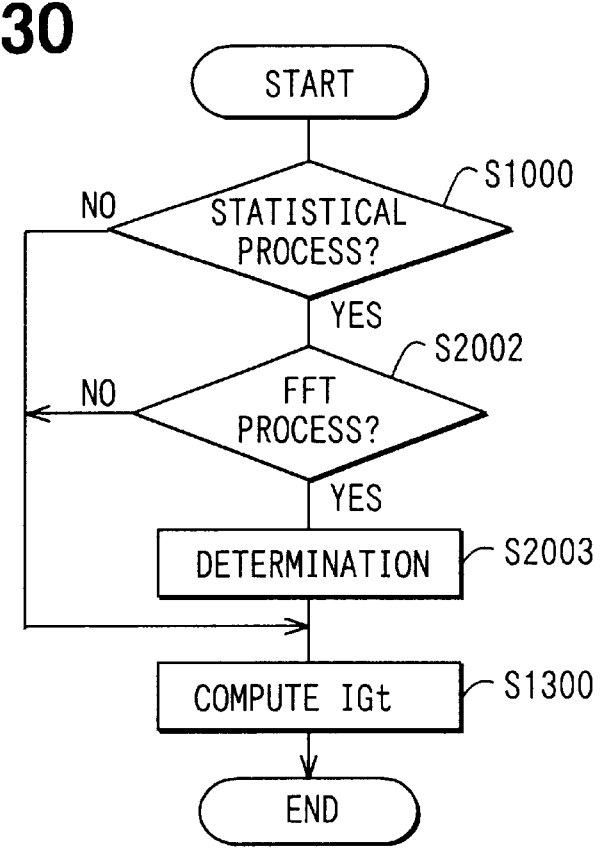
FIG. 30 is a flowchart showing a knock control process according to a fourth embodiment.

FIG. 30 shows a fourth embodiment of the present invention. Alternative to the S1100 of FIG. 12, a frequency analyzing process performed by the Fast Fourier Transform (FFT) process is used in a S2002. A final determination of the occurrence of knock is determined based on determination results of the statistical process and the FFT process in a S2003.

Figures 31, 32:
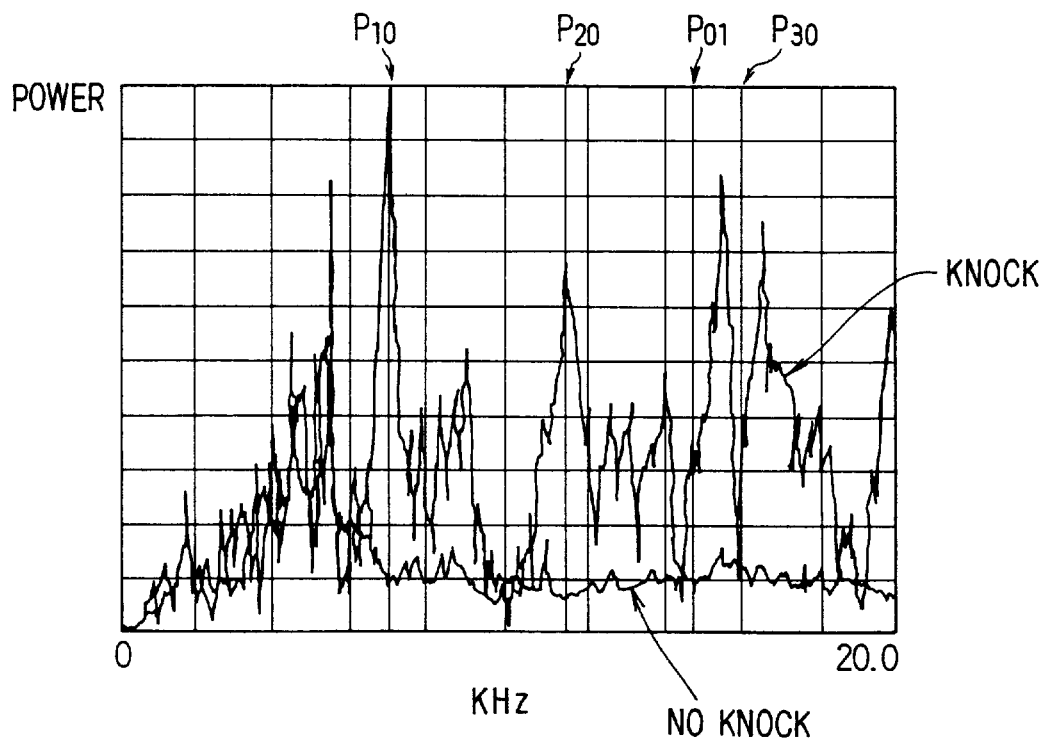
FIG. 31 is a chart showing resonance modes and resonance frequency according to the fourth embodiment.
FIG. 32 is a graph showing power of a knock signal with respect to the frequency.

The knock has a resonance frequency that is determined by a diameter of the combustion chamber bore and the speed of sound as disclosed in JP-A-H03-47449. The resonance frequencies and modes of resonance Pnm are estimated as shown in FIG. 31, where n is a degree in a radial direction, and m is a degree in a circumferential direction. However, an actual engine does not generate knock in the frequencies indicated in FIG. 31. FIG. 32 shows examples of power distribution of knock signal with respect to the signal frequency. FIG. 32 shows a distribution when no knock occurs and a distribution when a knock occurs. Referring to FIG. 32, the knock components of the resonance modes P10 and P20 can be find on the estimated frequency 7.0 kHz and 11.6 kHz. However, the knock components of the resonance mode P01 and P30 appear on 15.5 kHz and 16.5 kHz that are different from the estimated frequency 14.6 kHz and 16.0 kHz respectively. The actual frequencies of the resonance modes P10 and P20 may also vary in accordance with ignition cycles as well as the resonance modes P01 and P30. Therefore, it is needed to search the frequencies that indicate the knock. In the FFT process, threshold values are determined with respect to the frequencies that indicate the knock, respectively.

Figure 33:
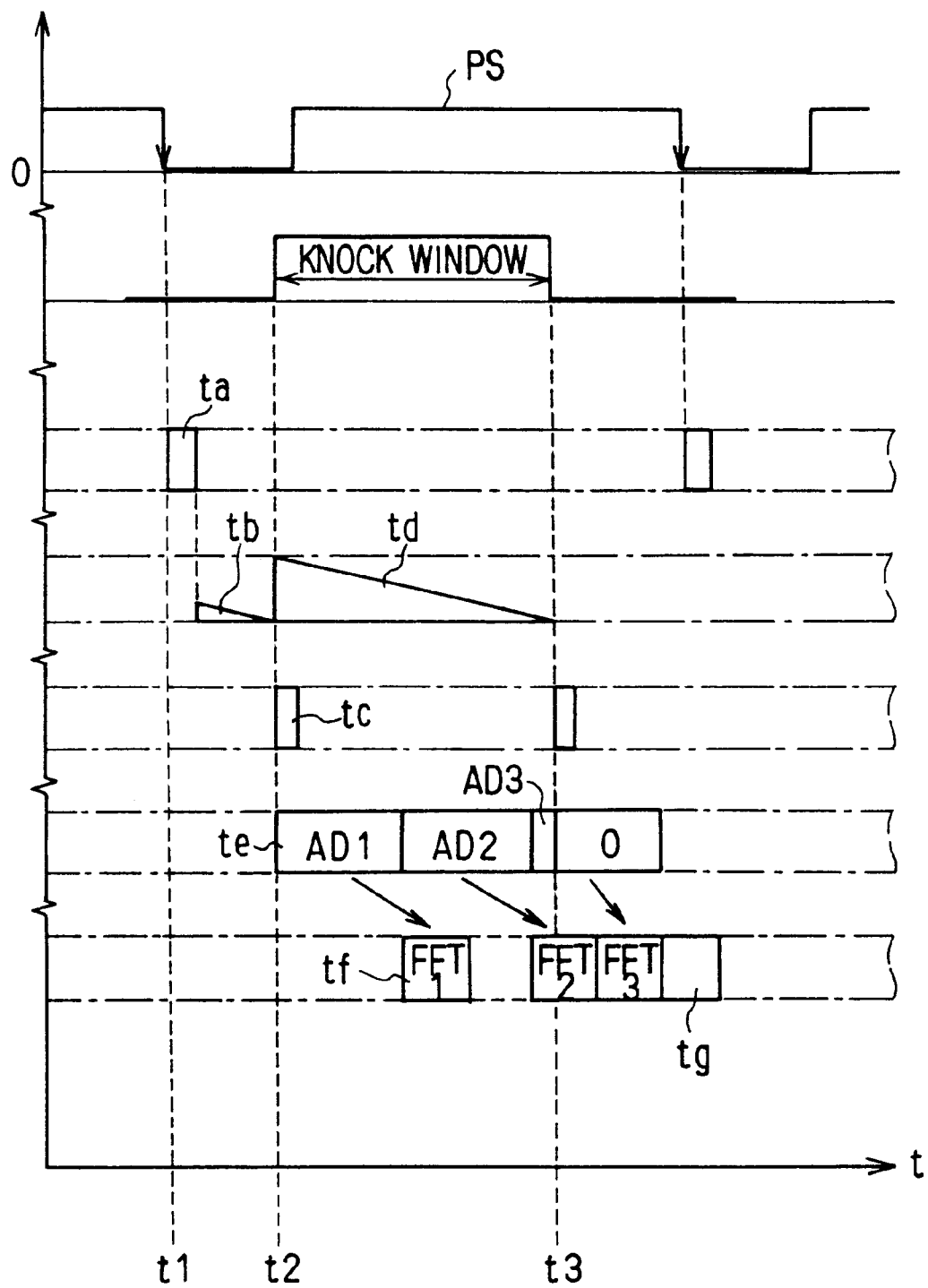
FIG. 33 is a time chart showing a reference position signal, a knock window, interrupt processes responsive to the reference position signal, a timer process, interrupt process responsive to the timer-1, interrupt process responsive to the timer-2, and FFT processes according to the fourth embodiment.

FIG. 33 is a time chart showing the FFT process carried out by the DSP 84. The trailing edge of the reference position signal PS indicates ATDC-10 crank angle degrees (° CA). In a case in which the trailing edge appears at t1 as shown in FIG. 33, the DSP 84 executes a reference position interrupt process ta in response to the trailing edge of the reference position signal PS. The process ta sets and starts a timer-1 process tb. Then, when the timer-1 process is completed, a timer-1 interrupt process tc is executed. The timer-1 interrupt process tc sets and starts a timer-2 process td, and activates a timer-2 interrupt process te. The timer-2 process determines a knock window that begins at t2 and ends at t3 as shown in FIG. 33. The timer-2 interrupt process te inputs digital data of the sensor signal during the knock window. The process is executed once every 20 microseconds ($\mu s$).

The FFT process handles data of $2^n$, in the embodiment, the FFT process handles $2^7=128$ data as a unit of data AD1, AD2, AD3 and ADn. The timer-2 interrupt process te repeatedly inputs the data during the knock window and assembles the unit of data. The timer-2 interrupt process te activates a main process tf when the first unit of data AD1 is assembled. In a case of FIG. 33, the timer-2 interrupt process te activates the main process tf when the unit of data AD1 is assembled. The main process tf executes a first FFT process FFT1 for processing the data of AD1. Then, the main process tf executes a second FFT process FFT2 after the unit of data AD2 is assembled. The main process tf executes the third FFT process FFT3 just after the second FFT process FFT2 because the timer-2 interrupt process te is terminated in response to the end of the knock window. The timer-2 interrupt process te transmits effective data AD3 to the main process Tf. The main process Tf assembles the last unit of the data by assembling the effective data AD3 and data of zero. The third FFT process FFT3 processes the last unit of data. The main process tf sums results of the FFT1, FFT2 and FFT3 for obtaining a FFT result over the knock window. After completing the last FFT process FFT3, an ending process tg is executed.

Figure 34:
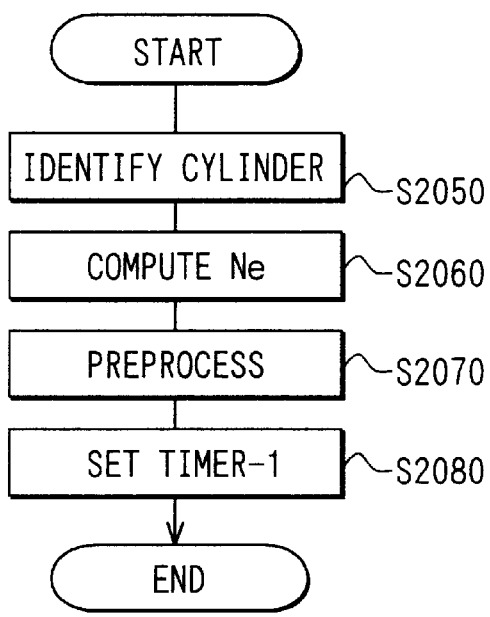
FIG. 34 is a flowchart showing an interrupt process responsive to a reference position signal according to the fourth embodiment.

FIGS. 34 through 44 show the detail of the above-described FFT process. FIG. 34 shows the reference position interrupt process. In a S2050, a cylinder that reaches the combustion phase next is identified based on the reference signal PS and the first cylinder detection signal GS. In the S2050, a sensor signal gain that corresponds to a distance between the identified cylinder and the knock sensor 35 is obtained based on the cylinder identifying process. In a S2060 an engine speed Ne is computed based on an elapsed time from the last reference signal to the present reference signal. In a S2070, the DSP 84 executes a preprocessing such as a gain setting process, a fail detecting process, and a timer setting. In a S2080, the DSP 84 sets and starts the timer-1 for waiting until a predetermined crank angle determined in accordance with the engine speed. The timer-1 defines about ATDC+10 crank angle degrees (° CA) because knock usually occurs around between ATDC+15 and ATDC+70 crank angle degrees (° CA).

Figure 35:
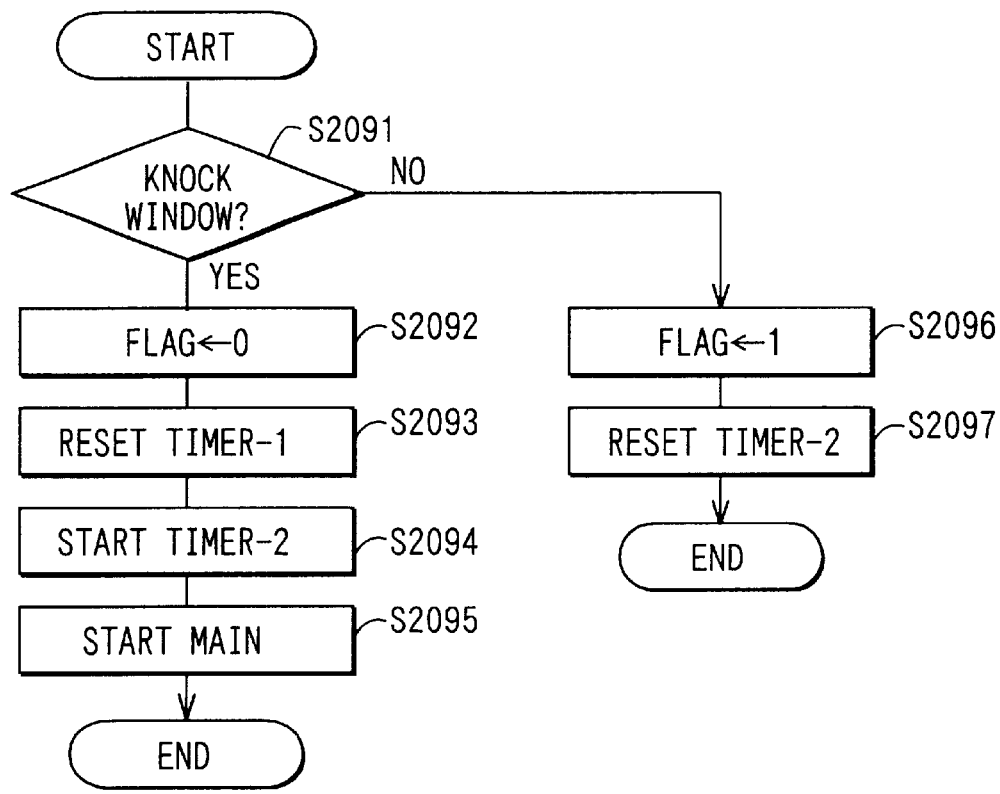
FIG. 35 is a flowchart showing an interrupt process responsive to a timer-1 according to the fourth embodiment.

FIG. 35 shows the timer-1 interrupt process. In a S2091, it is determined that whether or not the engine 10 is in the knock window. In the S2091, if a flag is one (1), the DSP 84 determines that it is a beginning of the knock window. In a S2092, the flag is set zero (0) to indicate the knock window. The DSP 84 resets the timer-1 in a S2093, and sets and starts the timer-2 in a S2094. The timer-2 defines an end of the knock window around ATDC+70 crank angle degrees (° CA), and activates the timer-2 interrupt process for sampling the sensor signal, for converting an analog sensor signal into digital signal, and for assembling the sampled digital signal into the unit of data ADn. In a S2095, the main process is started. If it is not the knock window, the flag is set one (1) in a S2096, and then the timer-2 is reset in a S2097. In the S2097, the timer-2 interrupt process for assembling the unit of data and is terminated.

Figure 36:
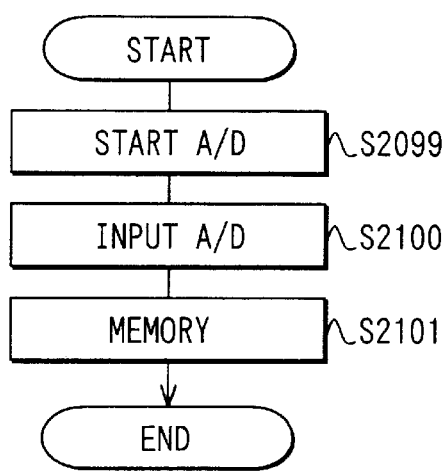
FIG. 36 is a flowchart showing an interrupt process responsive to a timer-2 according to the fourth embodiment.

FIG. 36 shows the timer-2 interrupt process. In a S2099 an AD converting is started. In a S2100, converted digital data is inputted into the DSP 84. In a S2101, the data is memorized into the RAM in a time sequence order for assembling the unit of data ADn.

Figure 37:
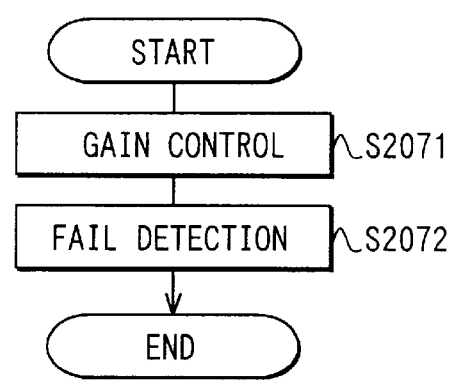
FIG. 37 is a flowchart showing a sensor signal regulating process according to the fourth embodiment.
Figure 38:
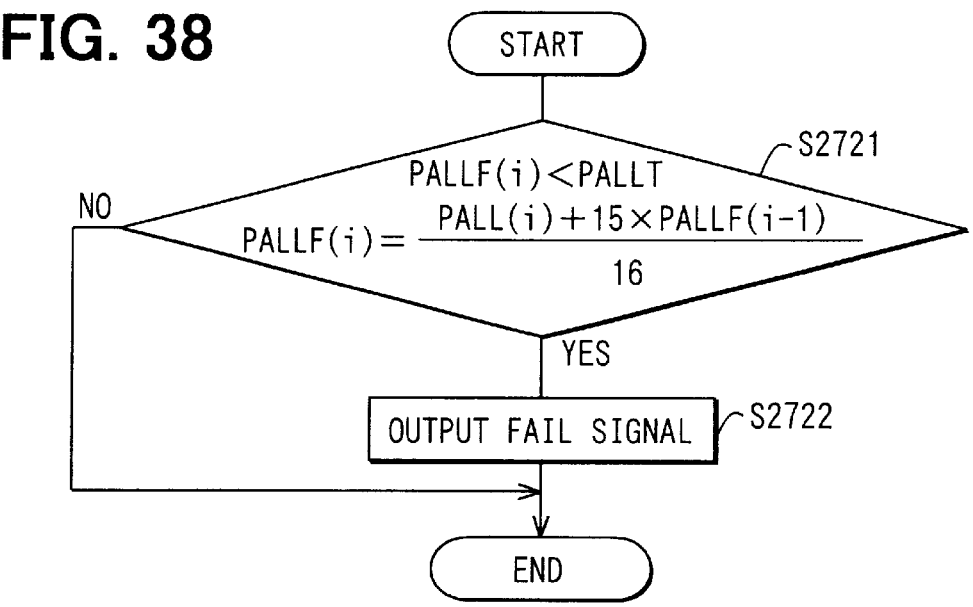
FIG. 38 is a flow chart showing the detail of the step 2072 in FIG. 37.

FIG. 37 shows the preprocessing process before the process of FIG. 36. In a S2071, the DSP 84 regulates the gain of the gain control circuit 83 so that the DSP 84 inputs the sensor signal with an adequate magnitude. In a S2072, the DSP 84 evaluates the sensor signal for detecting a fail of the knock sensor 35. FIG. 38 shows the detail of the S2072. In a S2721, the DSP 84 calculates a filtered value PALLF(i) and compares it with a predetermined threshold value PALLT. If the PALLF(i) is smaller than the PALLT, the DSP 84 outputs a fail signal to the MC 88 in a S2722. The PALLF(i) is obtained by a filtering process such as a $\frac{1}{16}$ delay filter defined by PALLF(i)=(PALL(i)+15×PALLF(i−1))/16, where PALL(i) is obtained by the main process.

Figure 39:
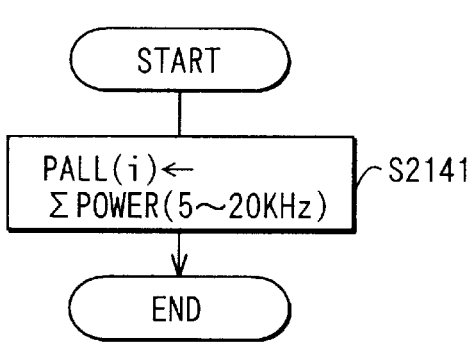
FIG. 39 is a flowchart showing a summation process of the power according to the fourth embodiment.

FIG. 39 shows a part of the main process for obtaining a total power PALL(i). In a S2141, the total power PALL(i) is obtained by summing powers within 5 kHz to 20 kHz.

Figure 40:
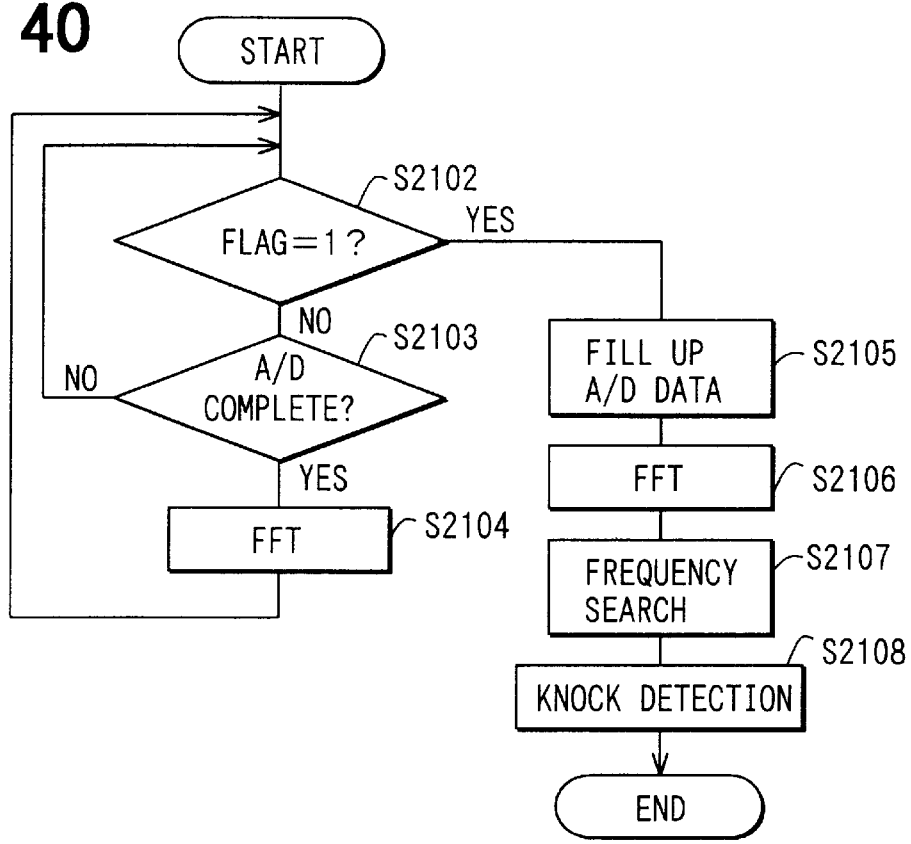
FIG. 40 is a flowchart showing a knock detection process utilizing the FFT process according to the fourth embodiment.

FIG. 40 shows a main part of the main process for determining a potential knock based on the FFT process. In a S2102, the flag is examined. In a S2103, it is determined that whether or not the AD converting is completed and the unit of data is assembled. If the flag is one (1) and the AD converting is completed, a FFT process is executed in a S2104 and the result of the FFT process is accumulated. If the flag is zero (0), the routine branches to a S2105. In the S2105, the DSP 84 assembles the last unit of data by filling zero (0) in vacancies. In a S2106, the last FFT process is executed and the result is accumulated. In a S2107, an ending process such as a frequency search process is executed. In the frequency search process, a frequency of knock is searched with respect to every ignition based on an accumulated result of the FFT processes in the knock window. In a S2108, it is determined that whether a knock occurs or not.

Figure 41:
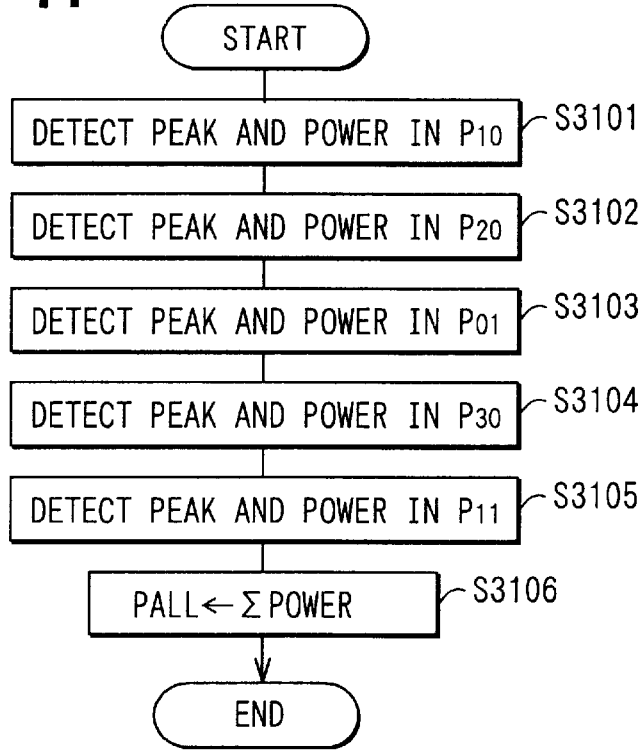
FIG. 41 is a flowchart showing the detail of the summation process according to the fourth embodiment.

FIG. 41 shows the detail of the ending process of the S2107. Each of S3101, S3102, S3103, S3104, and S3105 detects a peak value of each resonance mode and a power of each resonance mode. For example, in the S3101, a peak value in the resonance mode P10 is searched and a power of the resonance mode P10 is calculated. In a S3106, the total power PALL is calculated by a process as shown in FIG. 39.

Figure 42:
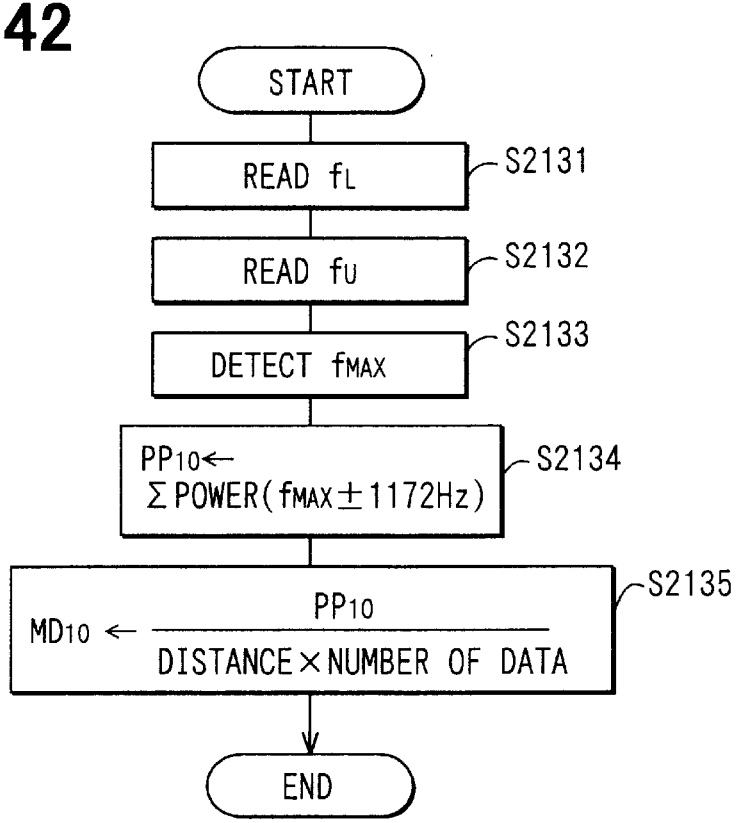
FIG. 42 is a flowchart showing the detail of the step 3101 in FIG. 41.
Figure 43:
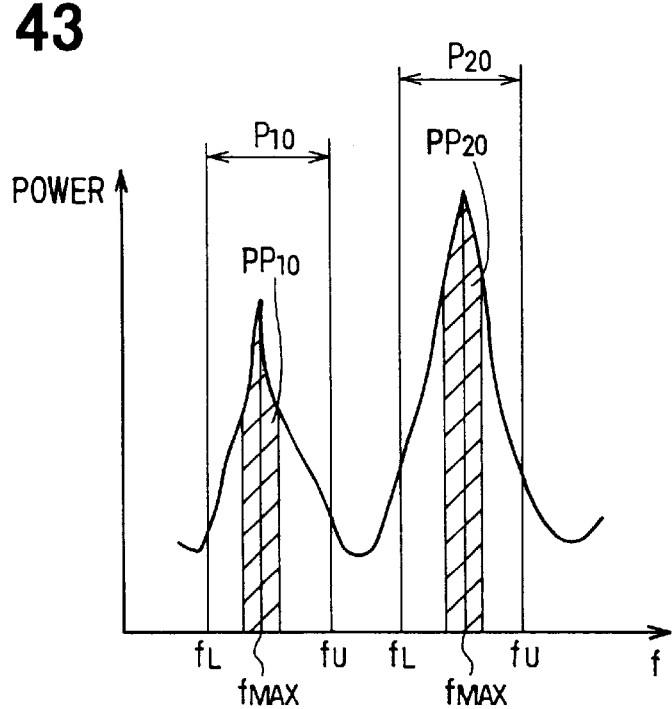
FIG. 43 is a graph showing a relationship between the power and the frequency for explaining the process shown in FIG. 42.

FIG. 42 shows the detail of the S3101. The S3102, S3103, S3104, and S3105 are similar to the S3101. FIG. 43 shows an enlarged view of a part of FIG. 32. In a S2131, a lower limit frequency fl for the resonance mode P10 is read from a memory device (e.g. ROM, not shown). In a S2132, an upper limit frequency fu for the resonance mode P10 is read from the memory device. The fl and the fu are determined to cover a range in which a knock component of the resonance mode P10 may appear. Therefore the fl and the fu define a slightly wider range than a range in which a knock component of the resonance mode P10 appears. In a S2133, the DSP 84 detects a frequency fmax where a maximum power within the range defined by the fl and fu appears. In a S2134, a total power PP10 is calculated by summing the power within a predetermined range from the fmax. In this embodiment, the power between fmax-1172 kHz and fmax+1172 kHz are integrated to provide the total power PP10. In a S2135, the total power PP10 is normalized based on the distance Dn between the cylinder detected and the knock sensor 35, and number of data Nd. In this embodiment, a normalized power MD10 is obtained by MD10=PP10/(Dn×Nd).

Figure 44:
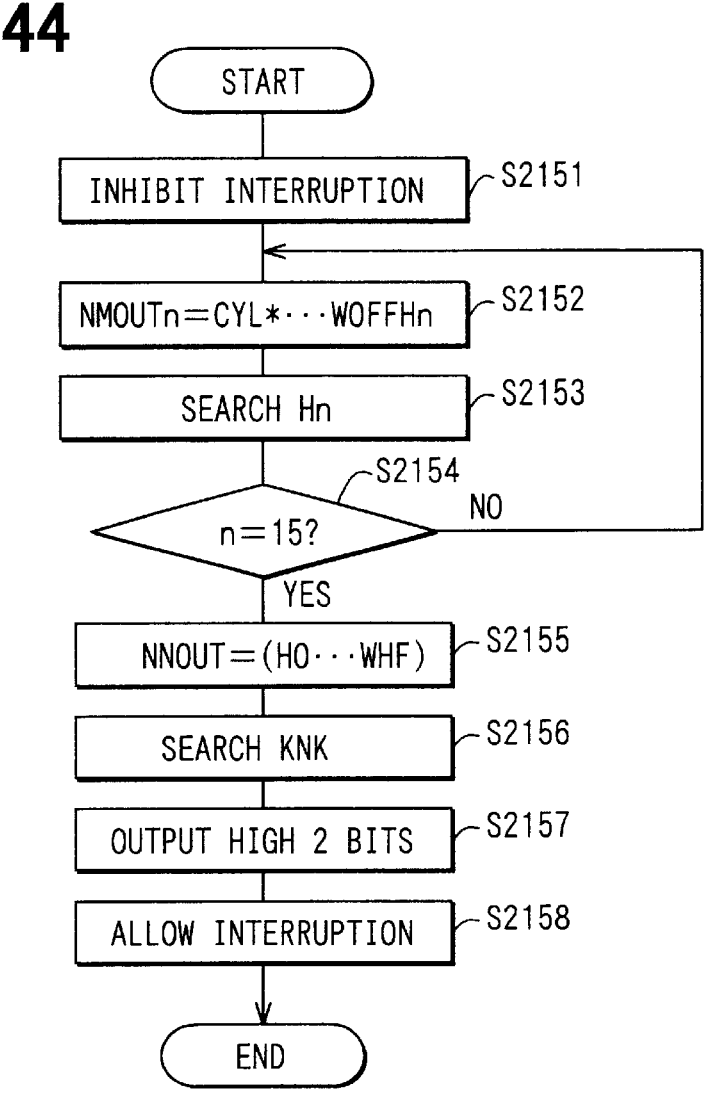
FIG. 44 is a flowchart showing the detail of the step 2108 in FIG. 40.

FIG. 44 shows the detail of the S2108. In a S2151, the DSP 84 inhibits an interrupt request. In a S2152, a middle output value NMOUTn is calculated as follows:

$$NMOUTn = CYL \times WCYLHn + TRPM \times WRPMHn + PALL \times WALLHn + MD10 \times W10Hn + MD20 \times W20Hn + MD01 \times W01Hn + MD30 \times W30Hn + MD11 \times W11Hn + WOFFHn$$

Figure 45:
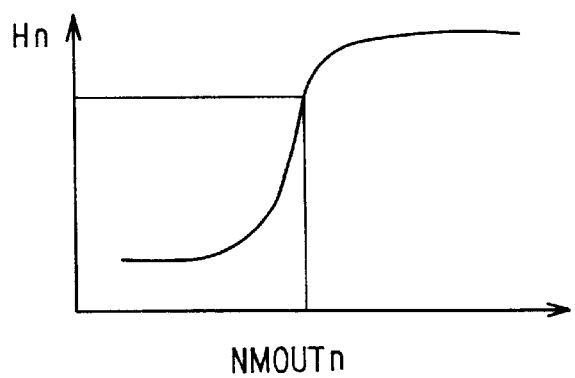
FIG. 45 is a graph showing a function for searching the output value of a neural net.

The CYL is a difference value between cylinders. The CYL can be obtained as a reciprocal of a filtered value of the PALL of each cylinder. The filtered value can be obtained by a ¾ filtering process. The TRPM indicates a period of the reference position signal PS. The MD10, MD20, MD01, MD30 and MD11 are the normalized power with respect to the resonance modes respectively. WCYLHn, WRPMHn, WALLHn, W10Hn, W20Hn, W01Hn, W30Hn, W11Hn, and WOFFHn are weighting values called as synapse coupling coefficients, where n is number of intermediate neurons. For example, n takes zero (0) to nine (9) and A to F, and n is initially set zero (0). In the embodiment, the NMOUTn is expressed by sixteen bits data. In a S2153, an intermediate neuron output Hn is obtained by looking up a sigmoid function based on an higher eight (8) bits of the NMOUTn. The sigmoid function may be obtained by f(x)=1/(1+exp(−x)) as shown in FIG. 45.

In a S2154, it is determined that whether n reaches fifteen (15). Therefore, the S2152 and S2153 are repeated for obtaining the outputs Hn of sixteen (16) intermediate neurons. In a S2155, an output NNOUT of an output layer neuron is computed as follows:

$$NNOUT = H0 \times WH0 + H1 \times WH1 + H2 \times WH2 + H3 \times WH3 + H4 \times WH4 + H5 \times WH5 + H6 \times WH6 + H7 \times WH7 + H8 \times WH8 + H9 \times WH9 + HA \times WHA + HB \times WHB + HC \times WHC + HD \times WHD + HE \times WHE + HF \times WHF$$

The WHn (n=0–F) are weighting values.

In a S2156, an output KNK is obtained by looking up the map as shown in FIG. 45. The output KNK indicates strength of knock by sixteen (16) bits data. In a S2157, high two (2) bits of the output KNK is outputted as a knock determination signal based on the strength of knock. In a S2158, the DSP 84 allows the interrupt request. Alternative to a neural net process for determining a knock described above, a fuzzy logic may be used for determining a knock in the S2108 of FIG. 40.

In this embodiment, a processes of FIG. 40 provides a frequency analyzing knock determining means, a process of FIG. 44 provides a potential knock determining means for determining an occurrence of knock in accordance with a result of the frequency analyzing process.

Figure 46:
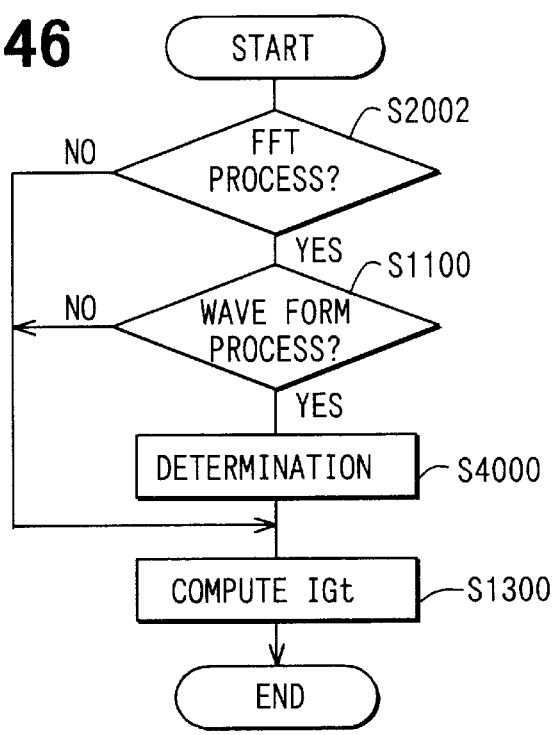
FIG. 46 is a flowchart showing a knock control process according to a fifth embodiment of the present invention.

FIG. 46 shows a fifth embodiment of the present invention. The fifth embodiment uses the FFT process described in the fourth embodiment and the waveform process described in the third embodiment. In a S4000, if both of the FFT process and the waveform process determines a potential knock, it is determined that an occurrence of knock. In this embodiment, the S4000 provides a final knock determining means.

Figure 47:
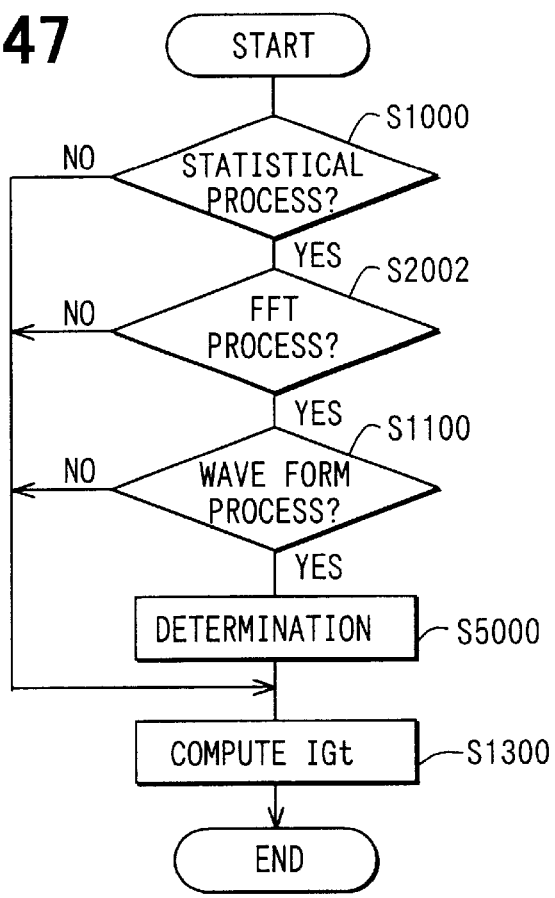
FIG. 47 is a flowchart showing a knock control process according to a sixth embodiment of the present invention.

FIG. 47 shows a sixth embodiment of the present invention. In the sixth embodiment, further to the fifth embodiment, the statistical process described in the third embodiment is used for determining a potential knock. In a S5000, if all of the statistical process, the FFT process and the waveform process determine a potential knock, it is determined that the occurrence of knock. In this embodiment, the S5000 provides a final knock determining means.

Alternative to the S5000, the occurrence of knock may be determined, when at least two of the processes determine a potential knock. In this case, it is desirable that at least the statistical process determines a potential knock, because the waveform process or the FFT process performs accurately when the sensor signal level is relatively high. For example, the waveform process or the FFT process improves the accuracy of the final determination when the statistical process determines an occurrence of knock. On the other hand, the statistical process improves the accuracy of the final determination when the waveform process or the FFT process determines an occurrence of knock when the sensor signal level is relatively low. In this embodiment, the process of FIG. 47 provides a final knock determining means. The knock determining method described in the third, fourth, fifth and sixth embodiments can be used for a knock detecting step S102 of FIG. 3.

Although, in the third to sixth embodiments, at least two of the knock determining processes using different processing methods are executed before the final determining process, the program may be modified so that one of the knock determining processes is executed when the other one of the knock determining processes determines an occurrence of knock. In the third to sixth embodiments, the processing order of the knock determining process can be changed.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A knock control apparatus for an engine, said apparatus comprising:
    base ignition timing setting means for setting base ignition timing in accordance with an operating condition of the engine;
    knock determining means for determining an occurrence of knock;
    retard value setting means for setting a retard value to retard the base ignition timing when the occurrence of knock is determined;
    retard value learning means for learning a learned value based on the retard value in a stable condition;
    base retard value setting means for setting a base retard value in accordance with an accelerating condition when an acceleration of the engine is determined;
    final corrective value setting means for setting a corrective value by correcting the base retard value based on the learned value; and
    ignition timing setting means for setting ignition timing when the engine is in an acceleration condition, the ignition timing being set based on the base ignition timing and the corrective value.

2. The knock control apparatus for an engine as in claim 1, wherein the learned value is one of a plurality of learned values learned with respect to a plurality of operating conditions of the engine.

3. The knock control apparatus for an engine as in claim 1, further comprising means for setting an ignition timing correcting period for correcting the ignition timing when the engine is in an acceleration condition in accordance with the learned value.

4. The knock control apparatus for an engine as in claim 1, further comprising means for setting an ignition timing return speed for returning the ignition timing from a corrected ignition timing in accordance with the learned value.

5. The knock control apparatus for an engine as in claim 2, wherein one of the learned values is initially set at a relatively advanced value, and said apparatus further comprising means for setting one of the learned value corresponding to a maximum retarded value of the learned values.

6. The knock control apparatus for an engine as in claim 1, wherein the acceleration condition includes the beginning of the acceleration condition.

7. A knock control apparatus for an engine, said apparatus comprising:
    a knock sensor that detectsengine knock;
    a plurality of knock determining means for determining an occurrence of engine knock, the determining means utilizing different processes for determining the occurrence of knock based on a knock sensor signal;
    final determining means for determining an occurrence of knock based on determinations of the plurality of determining means; and
    ignition timing control means for controlling ignition timing based on the determination of the final determining means;
    wherein the plurality of knock determining means includes:
        statistical knock determining means for determining an occurrence of knock by utilizing a statistical process that processes the sensor signal; and
        waveform knock determining means for determining an occurrence of knock based on a waveform characteristic of the sensor signal.

8. The knock control apparatus for an engine as in claim 7, wherein the waveform knock determining means operates when the statistical knock determining means determines an occurrence of knock.

9. The knock control apparatus for an engine as in claim 7, wherein the final determining means determines an occurrence of knock when both of the knock determining means determine an occurrence of knock.

10. A knock control apparatus for an engine, said apparatus comprising:
    a knock sensor that detects engine knock;
    a plurality of knock determining means for determining an occurrence of engine knock, the determining means utilizing different processes for determining the occurrence of knock based on a knock sensor signal;
    final determining means for determining an occurrence of knock based on determinations of the plurality of determining means; and
    ignition timing control means for controlling ignition timing based on the determination of the final determining means;
    wherein the plurality of knock determining means includes:
        statistical knock determining means for determining an occurrence of knock by utilizing a statistical process that processes the sensor signal; and
        frequency analyzing knock determining means for determining an occurrence of knock by utilizing a frequency analyzing process that processes the sensor signal.

11. The knock control apparatus for an engine as in claim 10, wherein the final determining means determines an occurrence of knock when both of the knock determining means determine an occurrence of knock.

12. A knock control apparatus for an engine, said apparatus comprising:
a knock sensor that detects engine knock;
a plurality of knock determining means for determining an occurrence of engine knock, the determining means utilizing different processes for determining the occurrence of knock based on a knock sensor signal;
final determining means for determining an occurrence of knock based on determinations of the plurality of determining means; and
ignition timing control means for controlling ignition timing based on the determination of the final determining means;
wherein the plurality of knock determining means includes:
waveform knock determining means for determining an occurrence of knock based on a waveform characteristic of the sensor signal; and
frequency analyzing knock determining means for determining an occurrence of knock by utilizing a frequency analyzing process that processes the sensor signal.

13. A knock control apparatus for an engine, said apparatus comprising:
a knock sensor that detects engine knock;
a plurality of knock determining means for determining an occurrence of engine knock, the determining means utilizing different processes for determining the occurrence of knock based on a knock sensor signal;
final determining means for determining an occurrence of knock based on determinations of the plurality of determining means; and
ignition timing control means for controlling ignition timing based on the determination of the final determining means;
wherein the plurality of knock determining means includes:
statistical knock determining means for determining an occurrence of knock by utilizing a statistical process that processes the sensor signal;
waveform knock determining means for determining an occurrence of knock based on a waveform characteristic of the sensor signal; and
frequency analyzing knock determining means for determining an occurrence of knock by utilizing a frequency analyzing process that processes the sensor signal, and
wherein the final determining means determines the occurrence of knock based on at least two determinations of the plurality of knock determining means.

14. The knock control apparatus for an engine as in claim 13, wherein the final determining means determines an occurrence of knock, when the statistical knock determining means determines an occurrence of knock, and the waveform knock determining means and/or the frequency analyzing knock determining means determines an occurrence of knock.

15. A knock control apparatus for an engine, said apparatus comprising:
a knock sensor that detects engine knock;
a plurality of knock determining means for determining an occurrence of engine knock, the determining means utilizing different processes for determining the occurrence of knock based on knock sensor signal;
final determining means for determining an occurrence of knock based on determinations of the plurality of determining means; and
ignition timing control means for controlling ignition timing based on the determination of the final determining means;
wherein one of the plurality of knock determining means includes statistical knock determining means for determining an occurrence of knock by utilizing a statistical process that processes the sensor signal, and
wherein the statistical knock determining means comprises:
means for detecting a maximum value of the sensor signal within a predetermined range;
means for setting a threshold value based on a shape of a distribution obtained by a logarithmic transformation of a distribution obtained by a logarithmic transformation of a plurality of maximum values detected by the detecting means; and
means for determining the occurrence of knock based on a threshold value and the sensor signal.

16. A knock control apparatus for an engine, said apparatus comprising:
a knock sensor that detects engine knock;
a plurality of knock determining means for determining an occurrence of engine knock, the determining means utilizing different processes for determining the occurrence of knock based on a knock sensor signal;
final determining means for determining an occurrence of knock based on determinations of the plurality of determining means; and
ignition timing control means for controlling ignition timing based on the determination of the final determining means;
wherein one of the plurality of knock determining means includes waveform knock determining means for determining an occurrence of knock based on a waveform characteristic of the sensor signal, and
wherein the waveform knock determining means comprises:
means for detecting a maximum value of the sensor signal;
means for setting a detecting period for detecting the maximum value; and
means for determining an occurrence of knock based on the maximum value detected in the detecting period.

17. A knock control apparatus for an engine, said apparatus comprising:
a knock sensor that detects engine knock;
a plurality of knock determining means for determining an occurrence of engine knock, the determining means utilizing different processes for determining the occurrence of knock based on a knock sensor signal;
final determining means for determining an occurrence of knock based on determinations of the plurality of determining means; and
ignition timing control means for controlling ignition timing based on the determination of the final determining means;
wherein one of the plurality of knock determining means includes frequency analyzing knock determining means for determining an occurrence of knock by utilizing a frequency analyzing process that processes the sensor signal, and wherein the frequency analyzing knock determining means includes:

means for AD converting the sensor signal and assembling a plurality of converted digital data into a plurality of data units;

means for executing a frequency analyzing process for analyzing the units of data respectively;

means for summing analyzed results with respect to the units; and means for determining an occurrence of knock by discriminating a signal indicative of knock and noise from the result of the means for summing.

18. A knock control method for an engine, said method comprising:

setting base ignition timing in accordance with an operating condition of the engine;

determining an occurrence of knock;

setting a retard value to retard base ignition timing when the occurrence of knock is determined;

learning a learned value based on the retard value established during a stable engine operating condition;

setting a base retard value in accordance with an accelerating condition when acceleration of the engine is determined;

setting a corrective value by correcting the base retard value based on the learned value; and setting ignition timing when the engine is in an acceleration condition, based on the base ignition timing and the corrective value.

19. A knock control method for an engine as in claim 18, wherein the learned value is one of a plurality of learned values learned with respect to a plurality of stable operating conditions of the engine.

20. A knock control method for an engine as in claim 18, further comprising setting an ignition timing correcting period for correcting ignition timing when the engine is in an acceleration condition in accordance with the learned value.

21. A knock control method for an engine as in claim 18, further comprising setting an ignition timing return speed for returning ignition timing from a corrected ignition timing in accordance with the learned value.

22. A knock control method for an engine as in claim 19, wherein one of the learned values is initially set at a relatively advanced value, and said method further comprises setting one of the learned values corresponding to a maximum retarded value of the learned values.

23. A knock control method for an engine as in claim 18, wherein the acceleration condition includes beginning of an acceleration condition.

24. A knock control method for an engine, said method comprising:

determining an occurrence of engine knock based on a plurality of different determining methods; and controlling ignition timing based on the determination of engine knock;

wherein the plurality of knock determining methods includes:

(a) determining an occurrence of knock by utilizing a statistical process that processes a knock sensor signal; and (b) determining an occurrence of knock based on a waveform characteristic of a knock sensor signal.

25. A knock control method for an engine as in claim 24, wherein the waveform knock determining means operates when the statistical knock determining means determines an occurrence of knock.

26. A knock control method for an engine as in claim 24, wherein the finally determining step determines an occurrence of knock only when both of the knock determining methods determine an occurrence of knock.

27. A knock control method for an engine, said method comprising:

determining an occurrence of engine knock based on a plurality of different determining methods; and controlling ignition timing based on said determination of engine knock;

wherein the plurality of knock determining methods includes:

(a) determining an occurrence of knock by utilizing a statistical process that processes a knock sensor signal; and (b) determining an occurrence of knock by utilizing a frequency analyzing process that processes a knock sensor signal.

28. A knock control method for an engine as in claim 27, wherein an occurrence of knock is determined only when both of the knock determining methods determine an occurrence of knock.

29. A knock control method for an engine, said method comprising:

determining an occurrence of engine knock based on a plurality of different determining methods; and controlling ignition timing based on the determination of engine knock;

wherein the plurality of knock determining methods includes:

(a) determining an occurrence of knock based on a waveform characteristic of a knock sensor signal; and (b) determining an occurrence of knock by utilizing a frequency analyzing process that processes a knock sensor signal.

30. A knock control method for an engine, said method comprising:

determining an occurrence of engine knock based on a plurality of different determining methods; and controlling ignition timing based on the determination engine knock;

wherein the plurality of knock determining methods includes:

(a) determining an occurrence of knock by utilizing a statistical process that processes a knock sensor signal;

(b) determining an occurrence of knock based on a waveform characteristic of a knock sensor signal; and (c) determining an occurrence of knock by utilizing a frequency analyzing process that processes a knock sensor signal, and wherein a final determining step determines the occurrence of knock based on at least two determinations of the plurality of knock determining methods.

31. A knock control method for an engine as in claim 30, wherein the finally determining step determines an occurrence of knock, when (a) the statistical knock determining method determines an occurrence of knock, and (b) the waveform knock determining method and/or the frequency analyzing knock determining method determines an occurrence of knock.

32. A knock control method for an engine, said method comprising:
   determining an occurrence of engine knock based on a plurality of different determining methods; and
   controlling ignition timing based on the determination of engine knock;
   wherein one of the plurality of knock determining methods includes determining an occurrence of knock by utilizing a statistical process that processes a knock sensor signal, and
   wherein the statistical knock determining method comprises detecting a maximum value of the sensor signal within a predetermined range; setting a threshold value based on the shape of a distribution obtained by a logarithmic transformation a plurality of maximum sensor signal values; and determining the occurrence of knock based on a threshold value and the sensor signal.

33. A knock control method for an engine, said method comprising:
   determining an occurrence of engine knock based on a plurality of different determining methods; and
   controlling ignition timing based on the determination of engine knock;
   wherein one of the plurality of knock determining methods includes determining an occurrence of knock based on a waveform characteristic of a knock sensor signal, and
   wherein the waveform knock determining method comprises:
      detecting a maximum value of the sensor signal;
      setting a detecting period for detecting the maximum value; and
      determining an occurrence of knock based on the maximum value detected in the detecting period.

34. A knock control method for an engine, said method comprising:
   determining an occurrence of engine knock based on a plurality of different determining methods; and
   controlling ignition timing based on the determination of engine knock;
   wherein one of the plurality of knock determining methods includes determining an occurrence of knock by utilizing a frequency analyzing process that processes a knock sensor signal, and
   wherein the frequency analyzing knock determining method includes:
      A to D converting a knock sensor signal and assembling a plurality of converted digital data into a plurality of data units;
      executing a frequency analyzing process for analyzing the units of data respectively;
      summing analyzed results with respect to the units; and
      determining an occurrence of knock by discriminating a signal indicative of knock and noise from the result of the summing.

* * * * *